US 11,565,924 B2
United States Patent — Long
(45) Date of Patent: Jan. 31, 2023

(54) LIFT TRUCK PALLET SENSOR

(71) Applicant: Hyster-Yale Group, Inc., Fairview, OR (US)

(72) Inventor: Darrell Long, Greenville, NC (US)

(73) Assignee: Hyster-Yale Group, Inc., Fairview, OR (US)

( * ) Notice: Subject to any disclaimer, the term of this patent is extended or adjusted under 35 U.S.C. 154(b) by 381 days.

(21) Appl. No.: 16/915,611

(22) Filed: Jun. 29, 2020

(65) Prior Publication Data

US 2021/0002114 A1    Jan. 7, 2021

Related U.S. Application Data

(60) Provisional application No. 62/869,316, filed on Jul. 1, 2019.

(51) Int. Cl.
*B66F 9/24* (2006.01)
*G08B 21/18* (2006.01)

(52) U.S. Cl.
CPC .............. *B66F 9/24* (2013.01); *G08B 21/18* (2013.01)

(58) Field of Classification Search
None
See application file for complete search history.

(56) References Cited

U.S. PATENT DOCUMENTS

| | | | | |
|---|---|---|---|---|
| 4,747,610 A | * | 5/1988 | Yingling | B62B 3/0612 280/43.12 |
| 10,822,011 B2 | * | 11/2020 | Rusche | B21D 53/88 |
| 2007/0137904 A1 | * | 6/2007 | Rose | B66F 9/24 180/19.1 |
| 2010/0089703 A1 | * | 4/2010 | Gallagher | B62D 51/04 187/231 |
| 2013/0127126 A1 | * | 5/2013 | Lantz | B66F 9/20 280/43.12 |

(Continued)

FOREIGN PATENT DOCUMENTS

| | | |
|---|---|---|
| JP | 07215695 | 8/1995 |
| WO | 2012158531 A1 | 11/2012 |

OTHER PUBLICATIONS

Extended European Search Report, EPO Pat. Appl. No. 20183265.6 (dated Oct. 27, 2020).

*Primary Examiner* — Phirin Sam
(74) *Attorney, Agent, or Firm* — Laurence & Phillips IP Law

(57) ABSTRACT

A system for a pallet truck load wheel mechanism comprises a logic device and first and second sensor arrangements. The first and second sensor arrangements include first and second sensing fields that define first and second edges of an operability window, respectively. The logic device has an operable state indicating that the load wheel mechanism can raise a pallet lifting device and an inoperable state indicating that the load wheel mechanism should not raise the pallet lifting device. The logic device is initialized in the operable state and is configured to change to the inoperable state in response to each time the first sensor arrangement detects an edge of a board intersecting, the first edge of the operability window and to change to the operable state in response to each time the second sensor arrangement detects an edge of a board intersecting the second edge of the operability window.

39 Claims, 12 Drawing Sheets

(56) References Cited

U.S. PATENT DOCUMENTS

| | | | |
|---|---|---|---|
| 2014/0195127 A1* | 7/2014 | Hoffman | B62B 3/001 |
| | | | 701/50 |
| 2017/0183159 A1* | 6/2017 | Weiss | B66F 9/0755 |
| 2017/0349197 A1 | 12/2017 | Jonasson et al. | |
| 2018/0118543 A1* | 5/2018 | Hoffman | B66F 9/24 |
| 2019/0270468 A1* | 9/2019 | Van Den Berg | B62B 3/0618 |
| 2020/0387154 A1* | 12/2020 | Sellner | G05D 1/0287 |

\* cited by examiner

180 — Insert fork containing an operability window into pallet pocket

181 — Via a first sensor, detecting a first edge of a pallet bottom board intersecting a first edge of the operability window 182 — Via a logic device, change towards a lifting mechanism inoperability state in response to detecting the first edge of the pallet bottom board intersecting the first edge of the operability window 183 — Via a second sensor, detecting the first edge of the pallet bottom board intersecting a second edge of the operability window 184 — Via the logic device, change towards a lifting mechanism operability state in response to detecting the first edge of the pallet bottom board intersecting the second edge of the operability window 185 — Withdraw fork containing an operability window from pallet pocket 186 — Via the second sensor, detecting the first edge of the pallet bottom board intersecting the second edge of the operability window 187 — Via a logic device, change towards a lifting mechanism inoperability state in response to detecting the first edge of the pallet bottom board intersecting the second edge of the operability window 188 — Via the first sensor, detecting the first edge of the pallet bottom board intersecting the first edge of the operability window 189 — Via the logic device, change towards a lifting mechanism operability state in response to detecting the first edge of the pallet bottom board intersecting the first edge of the operability window

FIG. 18

LIFT TRUCK PALLET SENSOR

RELATED APPLICATIONS

This application claims priority under 35 U.S.C. § 119(e) to U.S. Provisional Patent Appl. No. 62/869,316, filed Jul. 1, 2019, and entitled "Lift Truck Pallet Sensor." The entire disclosure of that provisional patent application is incorporated herein by reference.

TECHNICAL FIELD

The field of this disclosure relates generally to lift systems for pallet trucks and more particularly to pallet truck lift systems configured to hinder breaking boards on pallets.

BACKGROUND

Pallet trucks typically include a pair of forks for moving pallets. Proximate to the tips of the forks, load wheels are provided that are moved away from the forks for lifting a pallet off the ground and moved towards the forks for lowering the pallet onto the ground. Ideally, the load wheels and any associated linkage used to move the load wheels away from and towards the forks pass through openings in the bottom of a pallet without engaging and either damaging or breaking a bottom board of a pallet. However, often due to a load of goods on a pallet that impairs a view of the pallet, it is not always clear to a pallet truck operator whether the load wheels and any associated linkages are properly positioned in an opening in the bottom of a pallet and it is relatively common for pallet bottom boards to become damaged or broken because of contact by a load wheel or its associated linkage when lifting a pallet. Should a bottom board of a pallet become damaged or broken, it is often necessary to replace such a pallet, which sometimes includes transferring the goods on the damaged pallet to an undamaged pallet.

Many pallets have a top deck formed by a plurality of boards attached to beams extending perpendicularly to the boards, and a bottom deck fondled by a plurality of boards attached to the beams. Some pallets define two rectangular openings in the bottom that are approximately 9 inches wide with the long edge extending perpendicularly to the beams and the short edge extending parallel to the boards. Such openings are typically 27 inches apart from center-to-center. To provide rigidity for the center of the pallet, a center beam extends between and is attached to the top and bottom deck boards about midway between and parallel to the side beams. Because the forks of a pallet truck are typically wide, such forks must be inserted into a pallet perpendicular to the long edge of the openings in the bottom of the pallet. However, pallets come in various board and beam arrangements having different sized openings and openings located in different positions in the bottom of the pallet. Also, manufacturing errors may result in different sized openings in the bottom of a pallet. In addition to not seeing a pallet clearly because of a load, both of the above factors contribute to operators improperly positioning load wheels and/or their associated linkages and damaging or breaking bottom boards when lifting pallets.

To facilitate properly positioning load wheels and their associated linkages, pallet trucks are commonly designed with the load wheels positioned on the forks such that when an edge of a pallet engages the load rest, the load wheels and their linkages are positioned for unobstructed passage through the openings in the bottom, of a pallet. However, overhanging loads often contact the load rest instead of the pallet edge, or operators may not pay sufficient attention to whether a pallet edge engages the load rest, thus causing the load wheels and their associated linkages to be improperly aligned with the openings in the bottom of the pallet resulting in damaged or broken pallet bottom boards when the pallet is lifted.

The background description provided herein is for the purpose of generally presenting the context of the disclosure. Unless otherwise indicated herein, the materials described in this section are not prior art to the claims in this application and are not admitted to be prior art by inclusion in this section.

SUMMARY OF DISCLOSURE

One aspect of this disclosure relates to systems for wheel mechanisms in pallet trucks that incorporate sensor arrangements and a logic device, that are configured to lower the wheel only when it is not obstructed by pallet boards. An additional aspect relates to methods for determining operability or inoperability conditions for a lifting mechanism in a pallet lifting device in response to sensors detecting the placement of pallet boards. A further aspect relates to pallet trucks including a fork, a wheel mechanism, and a means for detecting a pallet board.

One embodiment is a system for a pallet truck load wheel mechanism. The system can include a logic device, a first sensor arrangement secured to the pallet truck on a first side of the load wheel mechanism and operatively connected to a logic device, and a second sensor arrangement secured to the pallet truck on a second side of the load wheel mechanism and operatively connected to the logic device. The first sensor arrangement can include a first sensing field that defines a first edge of an operability window. The second sensor arrangement can include a second sensing field that defines a second edge of the operability window. The logic device can include an operable state indicating that the load wheel mechanism can raise a pallet lifting device, and an inoperable state indicating that the load wheel mechanism should not raise the pallet lifting device. The logic device can be initialized in the operable state. The logic device can be configured to change to the inoperable state in response to each time the first sensor arrangement detects an edge of a board intersecting the first edge of the operability window. The logic device can be configured to change to the operable state in response to each time the second sensor arrangement detects an edge of a board intersecting the second edge of the operability window.

In some additional, alternative, or selectively cumulative embodiments, the system for a pallet truck load wheel mechanism includes a logic device that can include a counter.

In some additional, alternative, or selectively cumulative embodiments, the system for a pallet truck load wheel mechanism includes a logic device having a counter that can be configured to change to an inoperable state by incrementing the counter.

In some additional, alternative, or selectively cumulative embodiments, the system for a pallet truck load wheel mechanism includes a logic device having a counter that can be configured to change to an operable state by decrementing the counter.

In some additional, alternative, or selectively cumulative embodiments, the system for a pallet truck load wheel mechanism includes a logic device having a counter that can indicate an operable state for the load wheel mechanism to raise a pallet lifting device occurs when the counter equals zero.

In some additional, alternative, or selectively cumulative embodiments, the system for a pallet truck load wheel mechanism can include a third sensor arrangement that is operatively connected to the logic device.

In some additional, alternative, or selectively cumulative embodiments, the system for a pallet truck load wheel mechanism having a third sensor arrangement can be configured to detect a pallet above the pallet lifting device.

In some additional, alternative, or selectively cumulative embodiments, the system for a pallet truck load wheel mechanism having a third sensor arrangement can be configured to be in an operable state in response to the third sensor arrangement not detecting a pallet above the pallet lifting device.

In some additional, alternative, or selectively cumulative embodiments, the system for a pallet truck load wheel mechanism having a third sensor arrangement includes a logic device that can be configured to change between the operable state and the inoperable state in response to the first sensor arrangement and the second sensor arrangement detecting an object intersecting the first edge of the lifting mechanism operability window and the second edge of the lifting mechanism operability window, respectively, enabled by the third sensor arrangement detecting a pallet above the pallet lifting device.

In some additional, alternative, or selectively cumulative embodiments, the system for a pallet truck load wheel mechanism includes a logic device that includes a processor.

In some additional, alternative, or selectively cumulative embodiments, the system for a pallet truck load wheel mechanism can include a first sensor arrangement that includes an ultrasonic device and a reflector, and a second sensor arrangement that includes an ultrasonic device and a reflector.

In some additional, alternative, or selectively cumulative embodiments, the system for a pallet truck load wheel mechanism includes a logic device that can be configured to disable operation of the load wheel mechanism in response to the logic device indicating an inoperable state.

In some additional, alternative, or selectively cumulative embodiments, the system for a pallet truck load wheel mechanism includes a logic device that can be configured to enable operation of the load wheel mechanism in response to the logic device indicating the operable state.

In some additional, alternative, or selectively cumulative embodiments, the system for a pallet truck load wheel mechanism includes a logic device that can be configured to provide a disabled alert to an operator in response to the logic device indicating an inoperable state.

In some additional, alternative, or selectively cumulative embodiments, the system for a pallet truck load wheel mechanism includes a logic device that can be configured to provide an enabled alert to an operator in response, to the logic device indicating an operable state.

Another embodiment is a method for determining an operability condition or an inoperability condition for a lifting mechanism operably connected to a pallet lifting device. The method can include changing a logic device from a state indicating an operability condition for a lifting mechanism to a state indicating an inoperability condition for the lifting mechanism in response to a first sensor detecting an edge of a board intersecting a first edge of a lifting mechanism operability window as the pallet lifting device is inserted into a pocket of the pallet. The method can also include changing the logic device from a state indicating the inoperability condition for the lifting mechanism to the state indicating the operability condition for the lifting mechanism in response to a second sensor detecting the edge of the board intersecting a second edge of the lifting mechanism operability window as the pallet lifting device is inserted into the pocket, of the pallet.

In some additional, alternative, or selectively cumulative embodiments, the method for determining an operability or inoperability condition for a lifting mechanism operably connected to a pallet lifting device can include changing the logic device from a state indicating an operability condition for the lifting mechanism to a state indicating an inoperability condition for the lifting mechanism in response to the second sensor detecting the edge of the board intersecting the second edge of the lifting mechanism operability window in response to the pallet lifting device being withdrawn from the pallet.

In some additional, alternative, or selectively cumulative embodiments, the method for determining an operability or inoperability condition for a lifting mechanism operably connected to a pallet lifting device can include changing the logic device from a state indicating an inoperability condition for the lifting mechanism to a state indicating an operability condition for the lifting mechanism in response to the first sensor detecting the edge of the board intersecting the first edge of the lifting mechanism operability window in response to the pallet lifting, device being withdrawn from the pallet.

In some additional, alternative, or selectively cumulative embodiments, the method for determining an operability or inoperability condition for a lifting mechanism operably connected to a pallet lifting device can include changing the logic device from a state indicating an operability condition for the lifting mechanism to a state indicating an inoperability condition for the lifting mechanism by incrementing a counter by one. The method can include changing the logic device from a state indicating an inoperability condition for the lifting mechanism to a state indicating the operability condition for the lifting mechanism by decrementing the counter by one.

In some additional, alternative, or selectively cumulative embodiments, the method for determining an operability condition or an inoperability condition for a lifting mechanism operably connected to a pallet lifting device can include changing the logic device to a state indicating an inoperability condition for the lifting mechanism by incrementing the counter by one in response to the first sensor detecting a second edge of the board intersecting the first edge of the lifting mechanism operability window.

In some additional, alternative, or selectively cumulative embodiments, the method for determining an operability condition or an inoperability condition for a lifting mechanism operably connected, to a pallet lifting device can include changing the logic device from a state indicating the inoperability condition for the lifting mechanism to a state indicating the operability condition for the lifting mechanism by decrementing the counter by one in response to the second sensor detecting the second edge of the board intersecting the second edge of the lifting mechanism operability window.

In some additional, alternative, or selectively cumulative embodiments, the method for determining an operability condition or an inoperability condition for a lifting mechanism operably connected to a pallet lifting device can include a logic device state that indicates an operability condition for the lifting mechanism occurs when the counter equals zero.

In some additional, alternative, or selectively cumulative embodiments, the method for determining an operability or inoperability condition for a lifting mechanism operably connected to a pallet lifting device can include detecting, by a first sensor, an edge of a board intersecting a first edge of a lifting mechanism operability window in response to the pallet lifting device being inserted into a pallet. The method can also include detecting, by a second sensor, the edge of the board intersecting a second edge of the lifting mechanism operability window in response to the pallet lifting device being inserted into the pallet.

In some additional, alternative, or selectively cumulative embodiments, the method for determining an operability or inoperability condition for a lifting mechanism operably connected to a pallet lifting device can include detecting, the edge of a board by transmitting an ultrasonic signal and detecting a reflection of the ultrasonic signal.

In some additional, alternative, or selectively cumulative embodiments, the method for determining an operability or inoperability condition for a lifting mechanism operably connected to a pallet lifting device can include disabling operation of the lifting mechanism in response to the logic device indicating an inoperable state.

In some additional, alternative, or selectively cumulative embodiments, the method for determining an operability or inoperability condition for a lifting mechanism operably connected to a pallet lifting device can include enabling operation of the lifting mechanism in response to the logic device indicating an operable state.

In some additional, alternative, or selectively cumulative embodiments, the method for determining an operability or inoperability condition for a lifting mechanism operably connected to a pallet lifting device can include providing a disabled alert to an operator in response to the logic device indicating an inoperable state.

In some additional, alternative, or selectively cumulative embodiments, the method for determining an operability or inoperability condition for a lifting mechanism operably connected to a pallet lifting device can include providing an enabled alert to an operator in response to the logic device indicating an operable state.

A further embodiment is a pallet truck that includes a fork, a load wheel mechanism on the fork, and a means for detecting whether a bottom board of a pallet is in an operability window defined as an area in which activation of the load wheel mechanism will not contact the bottom board of the pallet.

In some additional, alternative, or selectively cumulative embodiments, the means for detecting whether a bottom board of a pallet is in an operability window can include a means for alternately detecting leading and trailing edges of a bottom board of the pallet as the fork is inserted into a pocket of the pallet.

In some additional, alternative, or selectively cumulative embodiments, the means for detecting whether a bottom board of a pallet is in an operability window can include a means for monitoring whether the last detected edge of the bottom board is a leading edge or a trailing edge and thereby determining whether the bottom board of the pallet is in the operability window.

In some additional, alternative, or selectively cumulative embodiments, the pallet truck can include a means for alternately disabling and enabling operation of the lifting mechanism based on the determination whether the bottom board of the pallet is in the operability window.

In some additional, alternative, or selectively cumulative embodiments, the pallet truck can include a means for alternately providing a disabled alert and an enabled alert to an operator based on a determination whether the bottom board of the pallet is in the operability window.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the accompanying drawings. Unless otherwise expressly stated, the sizes, positions, etc., of components, features, elements, etc., as well as any distances therebetween, are not necessarily to scale, and may be disproportionate and/or exaggerated for clarity.

FIG. 18 is a flowchart of another example method for determining an operability condition or an inoperability condition for a lifting mechanism.

DETAILED DESCRIPTION OF EMBODIMENTS

Figure 1:
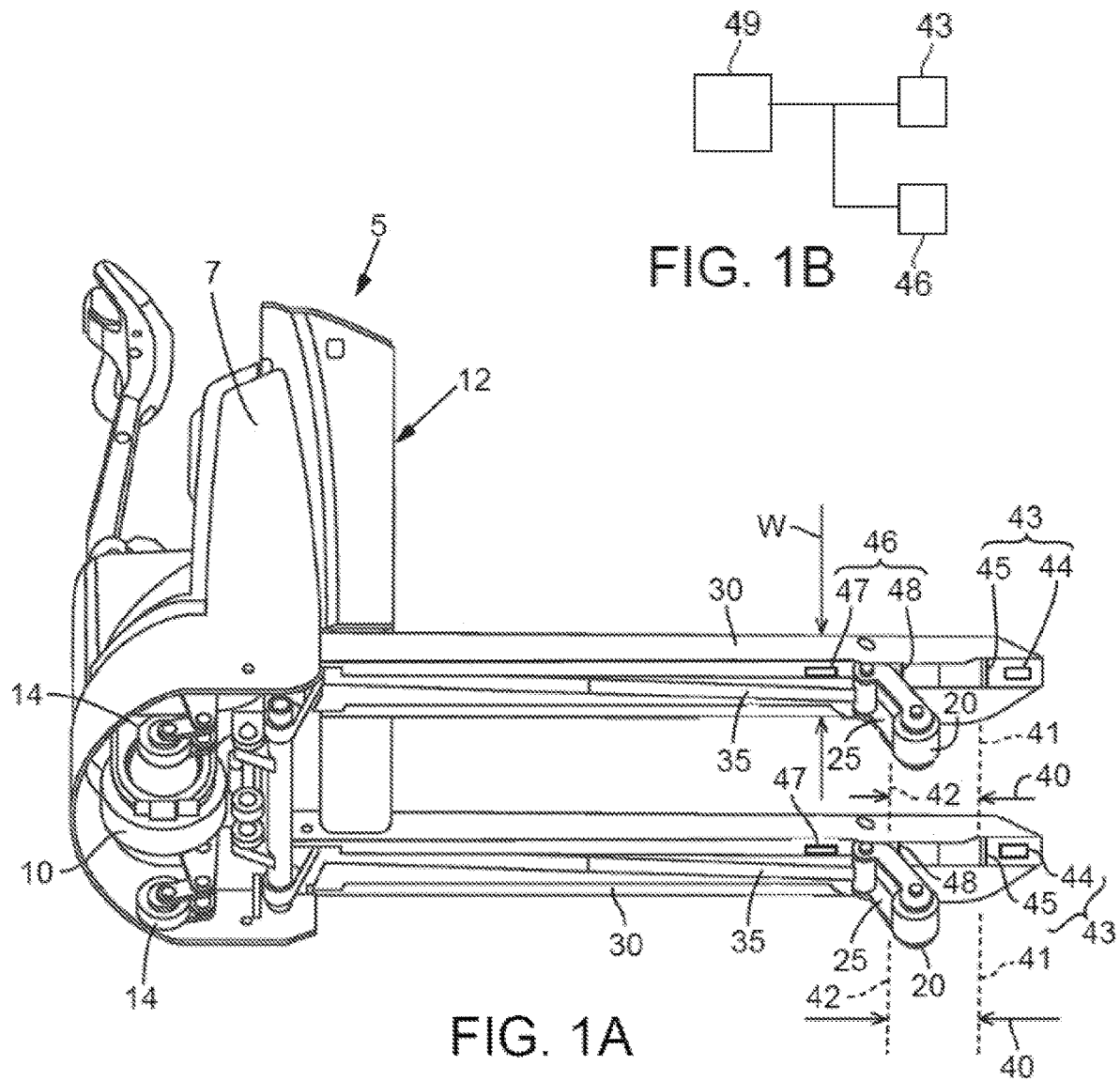
FIG. 1A is an isometric drawing, from a rear perspective, of an example pallet truck according to an embodiment.
FIG. 1B is a block diagram of the sensor and logic device components of the example pallet truck of FIG. 1A.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that like, elements disclosed below are indicated by like reference numbers in the drawings. The section headings used herein are for organizational purposes only and are not to be construed as limiting the subject matter described.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terminology used herein is for the purpose of describing particular example embodiments only and is not intended to be limiting. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, are open-ended and specify the presence of stated features, integers, steps, operations, elements, and/or components, but do not preclude the presence or addition of one or more other features, integers, steps, operations, elements, components, and/or groups thereof.

Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Unless clearly indicated otherwise, all connections and all operative connections may be direct or indirect. Similarly, unless clearly indicated otherwise, all connections and all operative connections may be rigid or non-rigid.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

The following disclosure relates to systems and methods for controlling pallet trucks, and in particular to systems and methods for sensing the positions of load wheels of a pallet truck with respect to openings in the bottom of a pallet. The systems and methods further relate to moving load wheels away from the pallet truck forks to lift a pallet without the load wheels or their associated linkages engaging and either damaging or breaking a board affixed to the bottom of a pallet. Pallet trucks may be manually operated, operated with automatic features that facilitate manual operation, or may be autonomous pallet trucks that do not require a human operator during operations.

In one embodiment, a sensing system for a pallet lifting device comprises a first sensor arrangement secured to the pallet lifting device on a first side of a lifting mechanism and operatively connected to a logic device, and a second sensor arrangement secured to the pallet lifting device on a second side of the lifting mechanism and operatively connected to the logic device. The first sensor arrangement includes a first sensing field that defines a first edge of a lifting mechanism operability window and the second sensor arrangement includes a second sensing field that defines a second edge of the lifting mechanism operability window. The logic device includes an initial state that indicates an operable state for the lifting mechanism to raise the pallet lifting device, and the logic device is configured to change from the initial state to a secondary state that indicates an inoperable state for the lifting mechanism to raise the pallet lifting device in response to one of the first sensor arrangement and the second sensor arrangement detecting an object intersecting the first edge of the lifting mechanism operability window or the second edge of the lifting mechanism operability window, respectively. The logic device is also configured to change from the secondary state to the initial state in response to the other one of the first sensor arrangement and the second sensor arrangement detecting an object intersecting the first edge of the lifting mechanism operability window or the second edge of the lifting mechanism operability window, respectively.

FIG. 1A illustrates a pallet truck 5 that includes forks 30 that fit a single pallet. However, pallet trucks with forks designed to fit multiple pallets and other suitable pallet trucks may be used with the technology disclosed herein.

The pallet truck 5 includes a body 7, a load rest 12 on a front end of the body 7, and a pair of forks 30 extending horizontally forwardly from a lower end of the load rest 12. The body 7 is supported on a drive wheel 10 and casters 14; and each fork 30 carries toward its forward end a load wheel 20 pivotally connected to the bottom of the fork 30 by a linkage 25. The body 7 houses a battery (not illustrated) and a motor (not illustrated) or other energy source and motive force device for powering the pallet truck 5, for example for turning the drive wheel 10 and operating a hydraulic pump for a hydraulic cylinder (not shown) to raise and lower a portion of the body 7 and the forks 30. The hydraulic cylinder is connected to the load rest 12 and to the linkages 25 via tie rods 35 extending between the linkages 25 and the body 7. To raise the forks 30, the hydraulic cylinder is actuated to lift the load rest 12 which raises the rearward end of the forks 30. At the same time, actuating the hydraulic cylinder pulls on the tie rods 35 which pivots the linkages 25 and lowers the load wheels 20 away from the forks 30, thus raising the forward ends of the forks 30 above a floor. Lowering the forks 30 is accomplished by draining hydraulic fluid from the hydraulic cylinder into a reservoir, so that gravity is allowed to lower the forks 30 and a portion of the body 7 which results in the load wheels 20 being retracted and swung by the linkages 25 into a position proximate the tips of the forks 30. The load wheels 20 continue to contact the floor and support the forks 30 when the forks 30 have been lowered.

Figure 2:
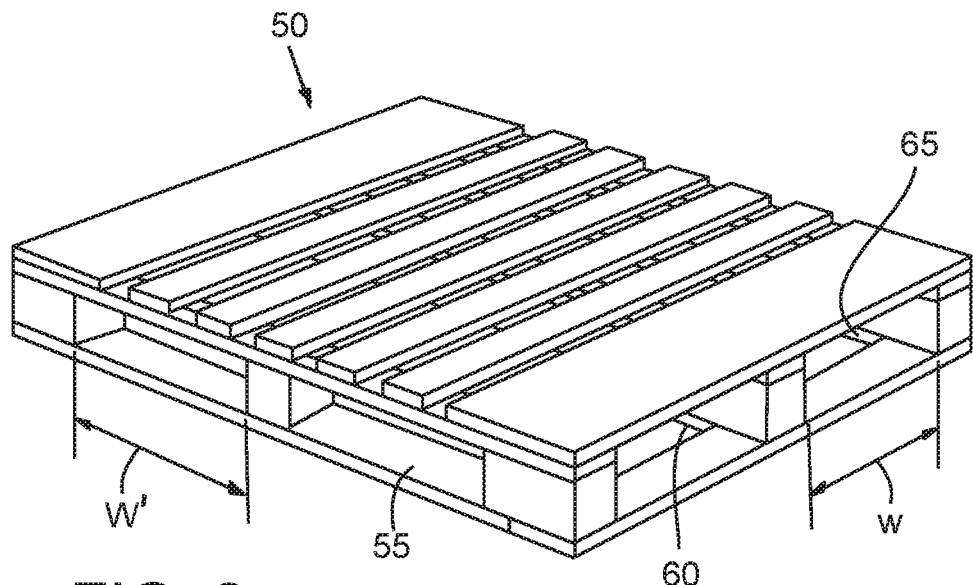
FIG. 2 is an orthogonal view of an example pallet.
Figure 3:
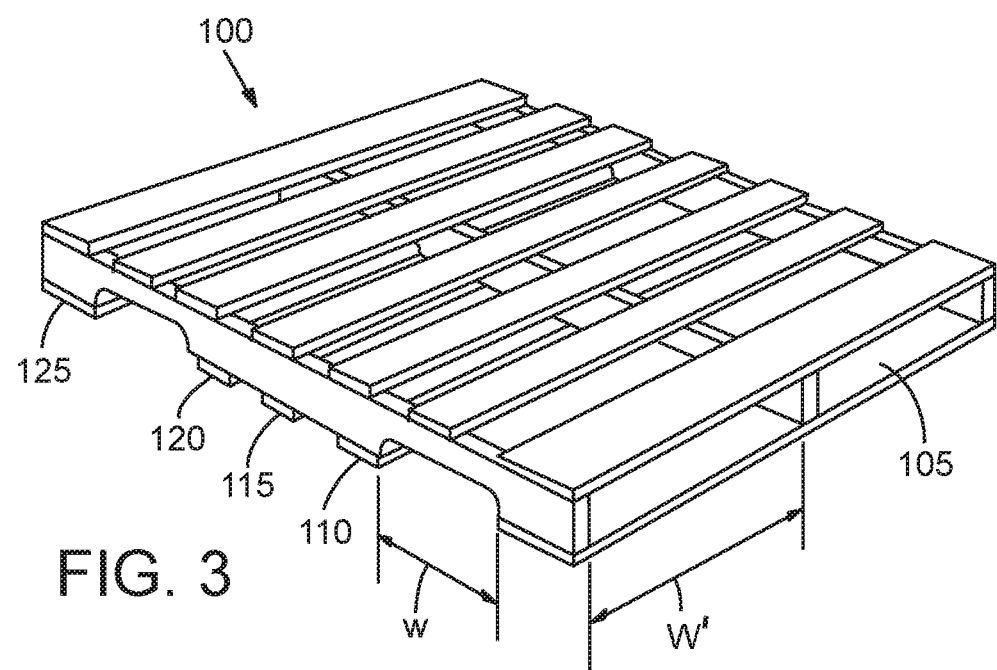
FIG. 3 is an orthogonal view of another example pallet.

The pallet truck 5 is configured to raise and lower a pallet, such as a pallet 50 or a pallet 100 illustrated in FIGS. 2 and 3, respectively, or other suitable pallet. Pallets are typically made of wood and include a top deck comprising a plurality of boards and a bottom deck comprising a plurality of boards. Strength and rigidity for the middle of the pallet is commonly provided by a center structure located midway between the sides of the pallet.

The pallets 50 and 100 are four-way entrance type pallets. Typically, pallets such as pallets 50 and 100, have one set of fork pockets with a width w and another set of fork pockets offset by 90 degrees with a width W' that is greater than the width w. Because of the loads to be supported, the forks 30 of the pallet truck 5 have a width W that is too wide to enter the pallet pockets having a width w. Therefore, in certain embodiments, the forks 30 are inserted into pallet pockets having the width W. When the forks 30 are inserted into the pallet pockets having a width W', the load wheels 20 traverse bottom boards of the pallet, such as bottom boards 55, 60, and 65 of the pallet 50, or bottom boards 105, 110, 115, 120, and 125 of the pallet 100. Before activating a hydraulic cylinder or other suitable lift mechanism, an operator should ensure that the load wheels 20 and their linkages 25 are properly positioned with respect to the bottom boards of the pallet so that the load wheels 20 and the linkages 25 may move away from the forks 30 without contacting and damaging or breaking any of the bottom boards of the pallet.

Because the linkages 25 move the load wheels 20 through an arc, each load wheel 20 has an associated operability window 40 (FIG. 1A) in which the load wheel 20 or its associated linkage 25 could damage or break a bottom board of a pallet should a bottom board of a pallet be within the operability window 40 when the load wheel 20 is moved away from the fork 30. Systems and methods described herein therefore provide a determination of whether a pallet bottom board is within an operability window and deactivate the lift mechanism if a pallet bottom board is within an operability window as described in more detail below. Systems and methods described herein may be used to raise forks bearing a pallet regardless of whether the pallet is seated against a load rest, is located midway on the forks, or is close to the tip of the forks distal from the load rest.

With reference to FIG. 1A, in one embodiment, the operability window 40 includes a first edge 41 and a second edge 42. A first sensor arrangement 43 comprising, an ultrasonic sensor 44 and an associated reflector 45 is secured to the fork 30 on a first side of a load wheel mechanism comprising the load wheel 20 and its associated linkage 25. The ultrasonic signal originating from the ultrasonic sensor 44 and reflected by the reflector 45 defines the first edge 41 of the operability window 40. A second sensor arrangement 46 comprising an ultrasonic sensor 47 and an associated reflector 48 is secured to the fork 30 on a second side of the load wheel mechanism comprising the load wheel 20 and its associated linkage 25. The ultrasonic signal originating from the ultrasonic sensor 47 and reflected by the reflector 48 defines the second edge 42 of the operability window 40. An edge of an operability window can include a continuous linear edge, a collection of two or more points arranged along a line, or it may comprise a single point.

Signals generated by the sensors, such as the first sensor arrangement 43 and/or the second sensor arrangement 46, can optionally be filtered to improve edge detection. For example, bandpass or low-pass filtering can aid in removing noise and/or other unwanted distortions from the sensor signals. An appropriate filter may be analog or digital and can be implemented in hardware, firmware, and/or software running on a processor described elsewhere in this document. Examples of digital filtering algorithms that may be employed include, by way of example and not limitation, simple moving average, weighted moving average, finite impulse response, and infinite impulse response filtering.

Operability windows may be constructed to account for the number of load wheels present at the tip of a fork, for anticipated spacing between bottom boards of a pallet, or other suitable factors. For example, for a pallet truck with a single load wheel per fork, the load wheels and linkages typically require approximately 7 inches of clearance for unobstructed movement away from the fork. Some pallets have at least some boards that are spaced approximately 9 inches apart, but other pallets may have a smaller maximum opening between bottom boards. As another example, a pallet truck with two load wheels per fork requires about 8.75 inches clearance for unobstructed movement of the wheels and linkages away from the fork. Therefore, with a maximum opening between bottom boards of a pallet of 9 inches, the operator must locate the operability window with an error tolerance of only 0.25 of an inch without damaging or breaking a bottom board.

The first sensor arrangement 43 and the second sensor arrangement 46 may be included on each of the forks 30 as illustrated in FIG. 1A, the first sensor arrangement 43 and the second sensor arrangement 46 may be included on one of the forks 30, or the first sensor arrangement 43 may be included on one of the forks 30 and the second sensor arrangement 46 may be included on the other of the forks 30. Ultrasonic sensors and reflectors are described for the sensor arrangements 43 and 46, however any suitable sensor that can define a first edge and a second edge for an operability window may be used.

Sensor arrangements 43 and 46 can, in certain embodiments, communicate with a logic device 49. For example, the logic device 49 may comprise a vehicle system manager, microcomputer, other suitable digital device, or one or more analog devices operating together. Communication may be over a wired connection, a wireless connection, a CAN (controller area network) bus, or other suitable connection between the sensor arrangements 43 and 46 and the logic device 49.

To hinder damaging or breaking bottom boards of a pallet because of improperly locating a load wheel operability window, embodiments of the technology disclosed herein can employ systems and methods for detecting and tracking whether a bottom board is within the operability window.

Examples of positioning the forks 30 at locations where the load wheels 20 and their linkages 25 are alternately not positioned to move freely downward between bottom boards of a pallet and are positioned to move freely downward between bottom boards of a pallet is described with reference to FIGS. 4 through 16. FIGS. 4 through 16 schematically illustrate the bottom boards of the pallet 50 on the top row and the bottom boards of the pallet 100 on the bottom row to demonstrate how systems and methods can accommodate pallets of different constructions without requiring modifications to the systems or methods. Such different pallet constructions include different pallet designs as well as pallets that are improperly made.

Figure 4:
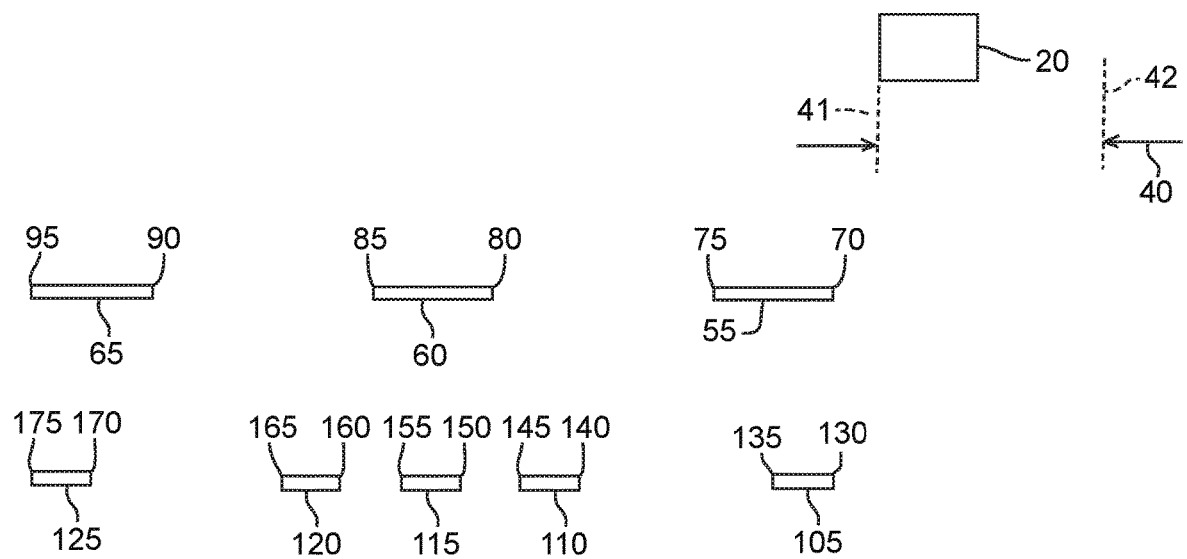
FIG. 4 is a schematic comparison of a load wheel entering over bottom boards of the example pallet of FIG. 2 and over the bottom boards of the example pallet of FIG. 3.

In FIG. 4, the load wheel 20 is outside of the pallet pockets having a width W' and the logic device 49 is set to an initial state that indicates that the lift mechanism may be activated to move the load wheel 20 and its associated linkage 25 away from the fork 30. For example, a counter incorporated into or otherwise associated with the logic device 49 may be set to 0 (zero).

Figure 5:
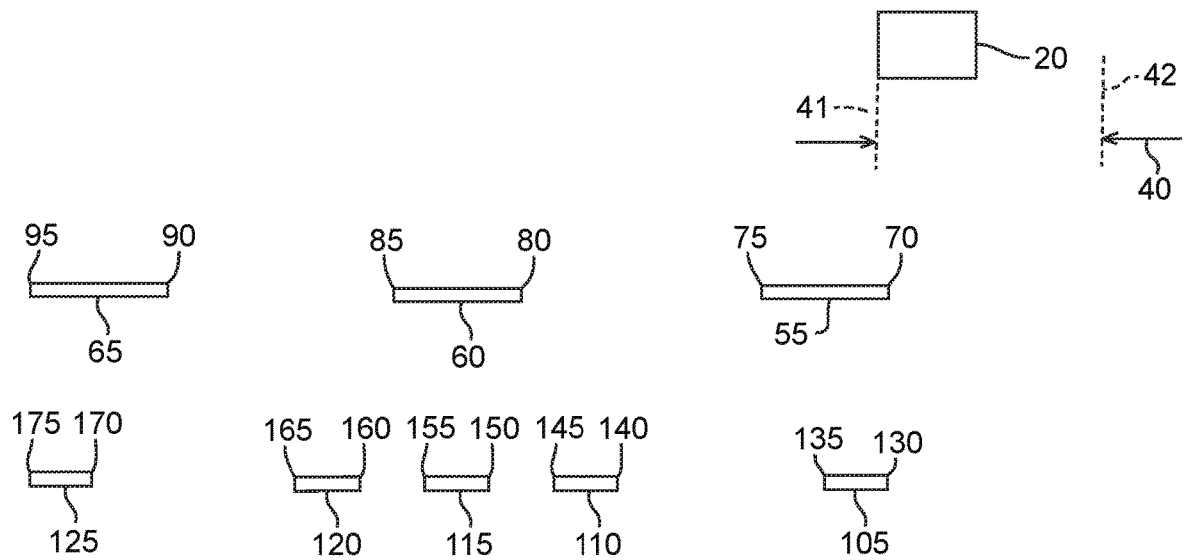
FIG. 5 is a schematic comparison of a load wheel continuing to enter over bottom boards of the example pallet of FIG. 2 and over the bottom boards of the example pallet of FIG. 3.

As the pallet truck 5 moves into the pallet 50 or the pallet 100 as illustrated in FIG. 5, the first edge 41 of the operability window encounters an edge 70 of the bottom board 55 or edge 130 of the bottom board 105. In response to detecting an edge of a bottom board, the first sensor arrangement 43 sends a signal to the logic device to implement a change to a logic device secondary state that indicates an inoperable state for the load wheel mechanism comprising the load wheel 20 and its associated linkage 25. For example, the logic device 49 increments a counter. At this point, the counter is at +1 with respect to the pallet 50 and is at +1 with respect to the pallet 100. With respect to both the pallet 50 and the pallet 100, the logic device 49 may send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 6:
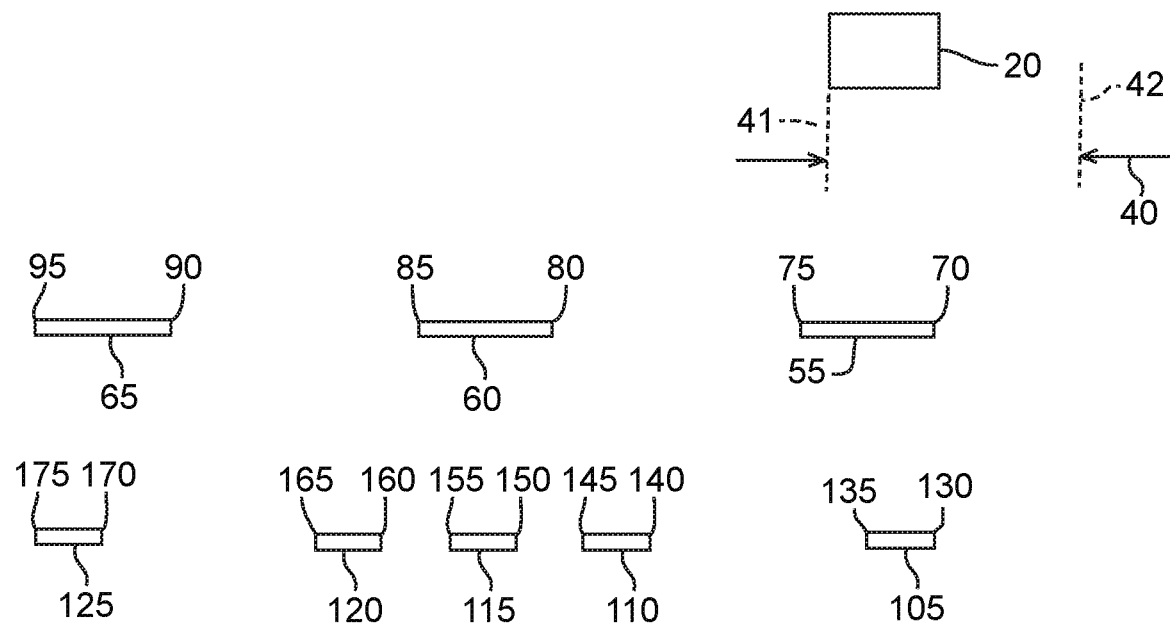
FIG. 6 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 6. With respect to the pallet 50, the first edge 41 of the operability window 40 continues to encounter the bottom board 55. In response to not detecting an edge of a bottom board, the first sensor arrangement 43 does not send a signal to the logic device 49. With respect to the pallet 100, the first edge 41 of the operability window 40 encounters an edge 135 of the bottom board 105. In response to detecting an edge of a bottom board, the first sensor arrangement 43 sends a signal to the logic device 49 to implement a change to a logic device secondary state. For example, the logic device 49 increments a counter. At this point, the counter remains at +1 with respect to the pallet 50 and is increased to +2 with respect to pallet 100. With respect to both the pallet 50 and the pallet 100, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 7:
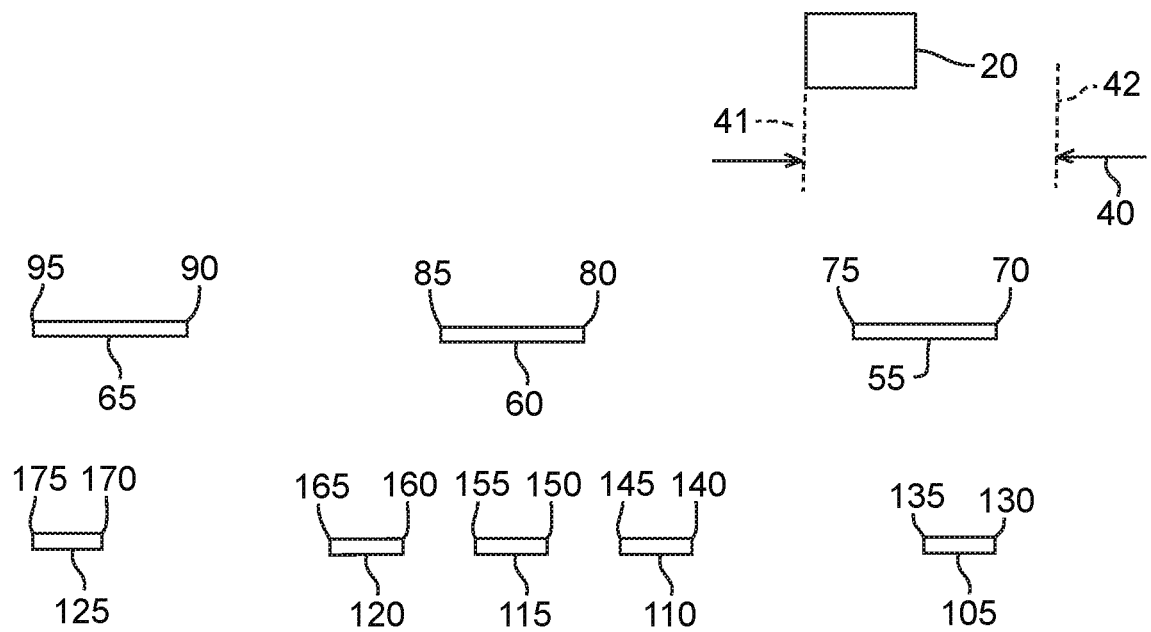
FIG. 7 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 7. With respect to the pallet 50, the first edge 41 of the operability window 40 encounters an edge 75 of the bottom board 55. In response to detecting an edge of a bottom board, the first sensor arrangement 43 sends a signal to the logic device to implement a change to a logic device secondary state. For example, the logic device 49 increments a counter. With respect to the pallet 100, the first edge 41 of the operability window 40 encounters the floor underneath the pallet 100. In response to not detecting an edge of a bottom board, the first sensor arrangement 43 does not send a signal to the logic device 49. At this point, the counter is increased +2 with respect to the pallet 50 and remains at +2 with respect to the pallet 100. With respect to both the pallet 50 and the pallet 100, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 8:
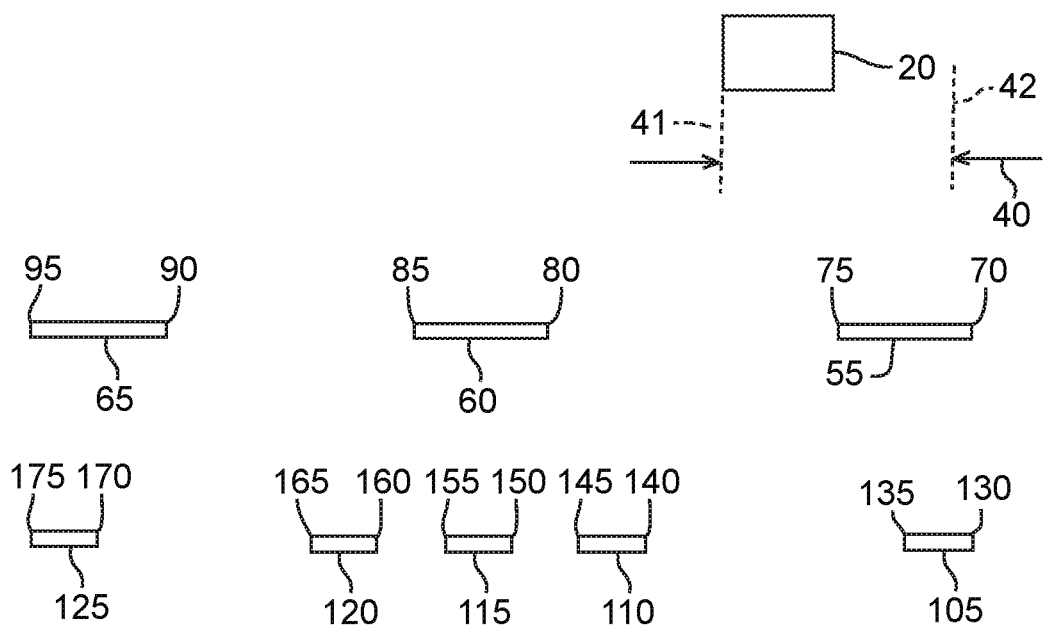
FIG. 8 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 8. With respect to the pallet 50, the first edge 41 of the operability window 40 encounters the floor underneath the pallet 50. In response to not detecting an edge of a bottom board, the first sensor arrangement 43 does not send a signal to the logic device 49. The second edge 42 of the operability window 40 encounters an edge 70 of the bottom board 55. In response to detecting an edge of a bottom board, the second sensor arrangement 46 sends a signal to the logic device to implement a change to a logic device secondary state. For example, the logic device 49 decrements a counter. With respect to the pallet 100, the first edge 41 of the operability window 40 encounters the floor underneath the pallet 100. In response to not detecting an edge of a bottom board, the first sensor arrangement 43 does not send a signal to the logic device 49. The second edge 42 of the operability window 40 encounters an edge 130 of the bottom board 105. In response to detecting an edge of a bottom board, the second sensor arrangement 46 sends a signal to the logic device 49 to implement a change to a logic device secondary state. For example, the logic device 49 decrements a counter. At this point, the counter is decreased to +1 with respect to the pallet 50 and is decreased to +1 with respect to the pallet 100. With respect to both the pallet 50 and the pallet 100, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 9:
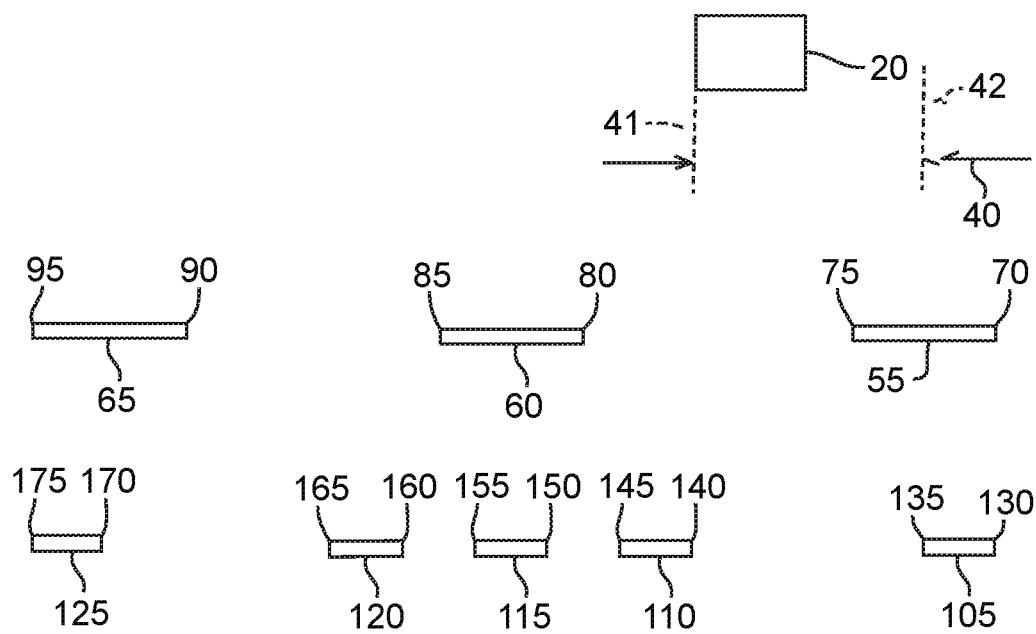
FIG. 9 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 9. With respect to the pallet 50, the first edge 41 of the operability window 40 encounters the floor underneath the pallet 50. In response to not detecting an edge of a bottom board, the first sensor arrangement 43 does not send a signal to the logic device 49. The second edge 42 of the operability window 40 encounters the bottom board 55. In response to not detecting an edge of a bottom board, the second sensor arrangement 46 does not send a signal to the logic device 49. With respect to the pallet 100, the first edge 41 of the operability window 40 encounters the floor underneath the pallet 100. In response to not detecting an edge of a bottom board, the first sensor arrangement 43 does not send a signal to the logic device 49. The second edge 42 of the operability window 40 encounters an edge 135 of the bottom board 105. In response to detecting an edge of a bottom board, the second sensor arrangement 46 sends a signal to the logic device 49 to implement a change to a logic device secondary state. For example, the logic device 49 decrements a counter. At this point, the counter remains at +1 with respect to the pallet 50 and is decreased to 0 (zero) with respect to the pallet 100. With respect to the pallet 50, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero). However, with respect to the pallet 100, the logic device 49 may send a signal to an indicator that informs the operator that the load wheel mechanism is clear to be extended away from the fork 30, may activate the lifting mechanism, or both while there is a change to the logic device to the initial state, for example, the counter has a value of 0 (zero).

Figure 10:
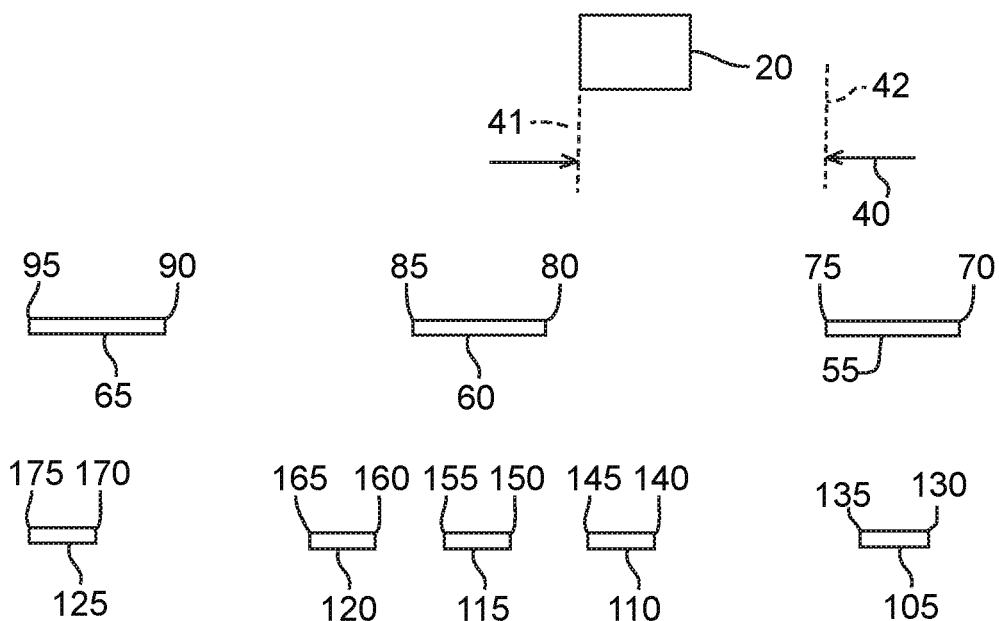
FIG. 10 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 10. With respect to the pallet 50, the first edge 41 of the operability window 40 encounters the floor underneath the pallet 50. In response to not detecting an edge of a bottom board, the first sensor arrangement 43 does not send a signal to the logic device 49. The second edge 42 of the operability window 40 encounters an edge 75 of the bottom board 55. In response to detecting an edge of a bottom board, the second sensor arrangement 46 sends a signal to the logic device to implement a change to a logic device secondary state. For example, the logic device 49 decrements a counter. With respect to the pallet 100, the first edge 41 of the operability window 40 encounters edges 140 and 145 of the bottom board 110. In response to detecting an edge of a bottom board, the first sensor arrangement 43 sends a signal to the logic device 49 to implement a change to a logic device secondary state. For example, the logic device 49 increments a counter. At this point, the counter is decreased to 0 (zero) with respect to the pallet 50 and is increased to +2 with respect to the pallet 100. With respect to the pallet 50, the logic device 49 may send a signal to an indicator that informs the operator that the load wheel mechanism is clear to be extended away from the fork 30, may activate the lifting mechanism, or both while there is a change to the logic device to the initial state, for example, the counter has a value of 0 (zero). However, with respect to the pallet 100, the logic device 49 may send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 11:
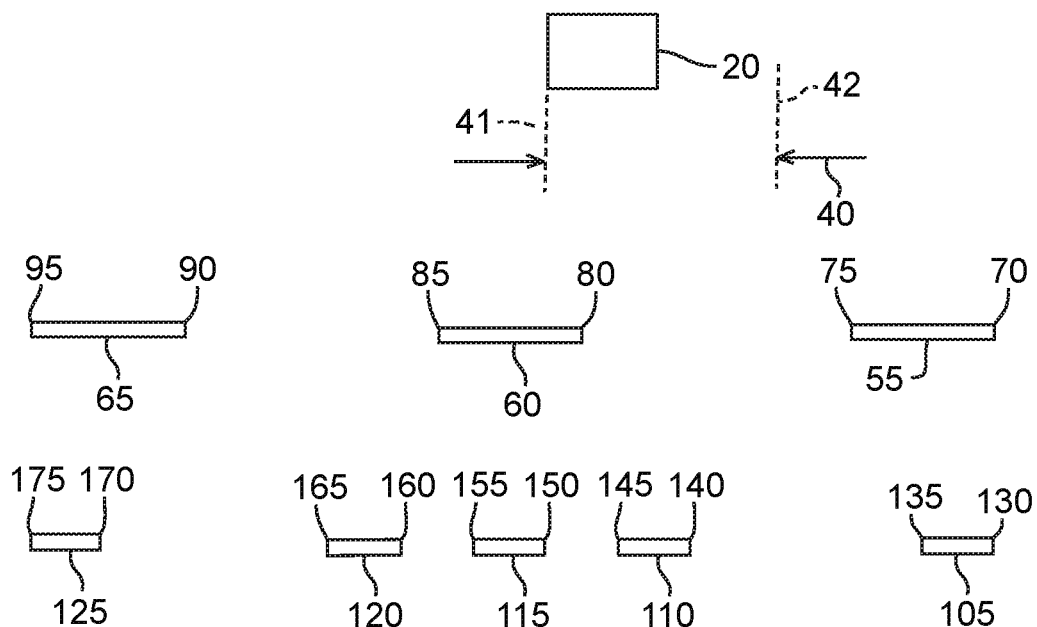
FIG. 11 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 11. With respect to the pallet 50, the first edge 41 of the operability window 40 encounters the edge 80 of the bottom board 60. In response to detecting an edge of a bottom board, the first sensor arrangement 43 sends a signal to the logic device 49 to implement a change to a logic device secondary state. For example, the logic device 49 increments a counter. The second edge 42 of the operability window 40 encounters the floor under the pallet 50. In response to not detecting an edge of a bottom board, the second sensor arrangement 46 does not send a signal to the logic device 49. With respect to the pallet 100, the first edge 41 of the operability window 40 encounters the edge 150 of the bottom board 115. In response to detecting an edge of a bottom board, the first sensor arrangement 43 sends a signal to the logic device 49 to implement a change to a logic device secondary state. For example, the logic device 49 increments a counter. The second edge 42 of the operability window 40 encounters the floor under the pallet 100. In response to not detecting, an edge of a bottom board, the second sensor arrangement 46 does not send a signal to the logic device 49. At this point, the counter is increased to +1 with respect to the pallet 50 and is increased to +3 with respect to the pallet 100. With respect to both the pallet 50 and the pallet 100, the logic device 49 may send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 12:
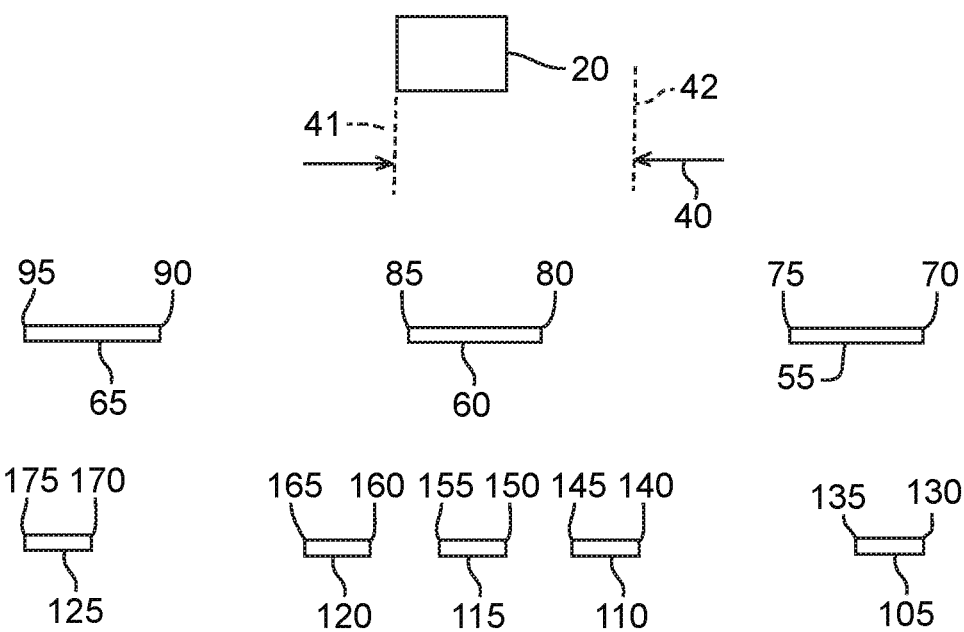
FIG. 12 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 12. With respect to the pallet 50, the first edge 41 of the operability window 40 encounters the edge 85 of the bottom board 60. In response to detecting an edge of a bottom board, the first sensor arrangement 43 sends a signal to the logic device 49 to implement a change to a logic device secondary state. For example, the logic device 49 increments a counter. The second edge 42 of the operability window 40 encounters the floor under the pallet 50. In response to not detecting an edge of a bottom board, the second sensor arrangement 46 does not send a signal to the logic device 49. With respect to the pallet 100, the first edge 41 of the operability window 40 encounters the edge 155 of the bottom board 115. In response to detecting an edge of a bottom board, the first sensor arrangement 43 sends a signal to the logic device 49 to implement a change to a logic device secondary state. For example, the logic device 49 increments a counter. The second edge 42 of the operability window 40 encounters an edge 140 of the bottom board 110. In response to detecting an edge of a bottom board, the second sensor arrangement 46 sends a signal to the logic device 49 to implement a change to a logic device secondary state. For example, the logic device 49 decrements a counter. At this point, the counter is increased to +2 with respect to the pallet 50 and remains at +3 with respect to the pallet 100. With respect to both the pallet 50 and the pallet 100, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 13:
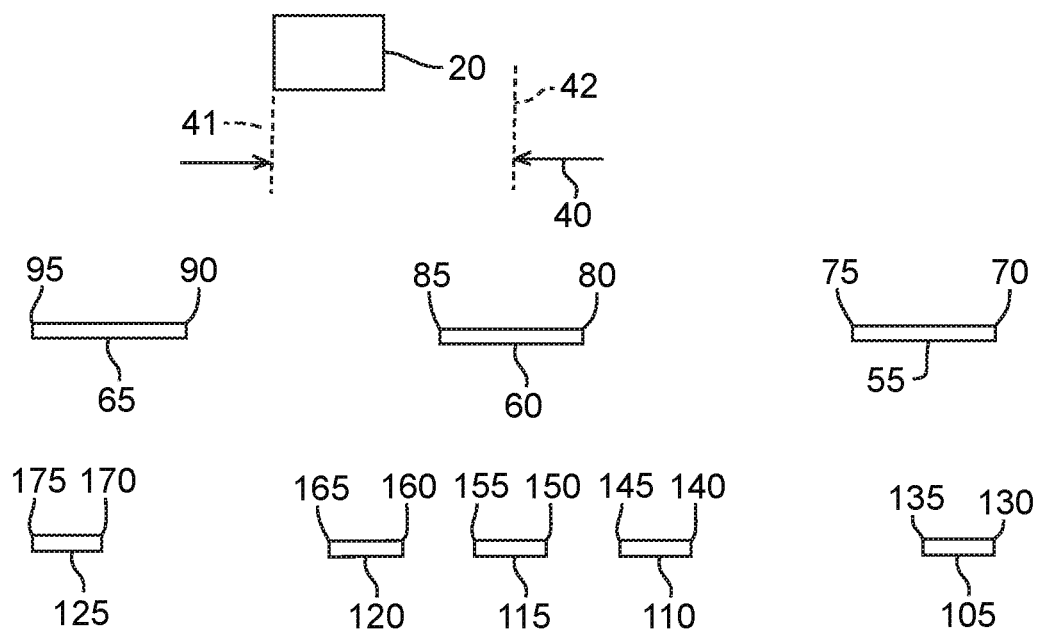
FIG. 13 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 13. With respect to the pallet 50, the first edge 41 of the operability window 40 encounters the floor under the pallet 50. In response to not detecting an edge of a bottom board, the first sensor arrangement 43 does not send a signal to the logic device 49. The second edge 42 of the operability window 40 encounters the edge 80 of the bottom board 60. In response to detecting an edge of a bottom board, the second sensor arrangement 46 sends a signal to the logic device 49 to implement a change to a logic device secondary state. For example, the logic device 49 decrements a counter. With respect to the pallet 100, the first edge 41 of the operability window 40 encounters the edges 160 and 165 of the bottom board 120. In response to detecting an edge of a bottom board, the first sensor arrangement 43 sends a signal to the logic device 49 to implement a change to a logic device secondary state. For example, the logic device 49 increments a counter. The second edge 42 of the operability window 40 encounters the edge 145 of the bottom board 110 and the edge 150 of the bottom board 115. In response to detecting an edge of a bottom board, the second sensor arrangement 46 sends a signal to the logic device 49 to implement a change to a logic device secondary state. For example, the logic device 49 decrements a counter. At this point, the counter is decreased to +1 with respect to the pallet 50 and remains at +3 with respect to the pallet 100. With respect to both the pallet 50 and the pallet 100, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 14:
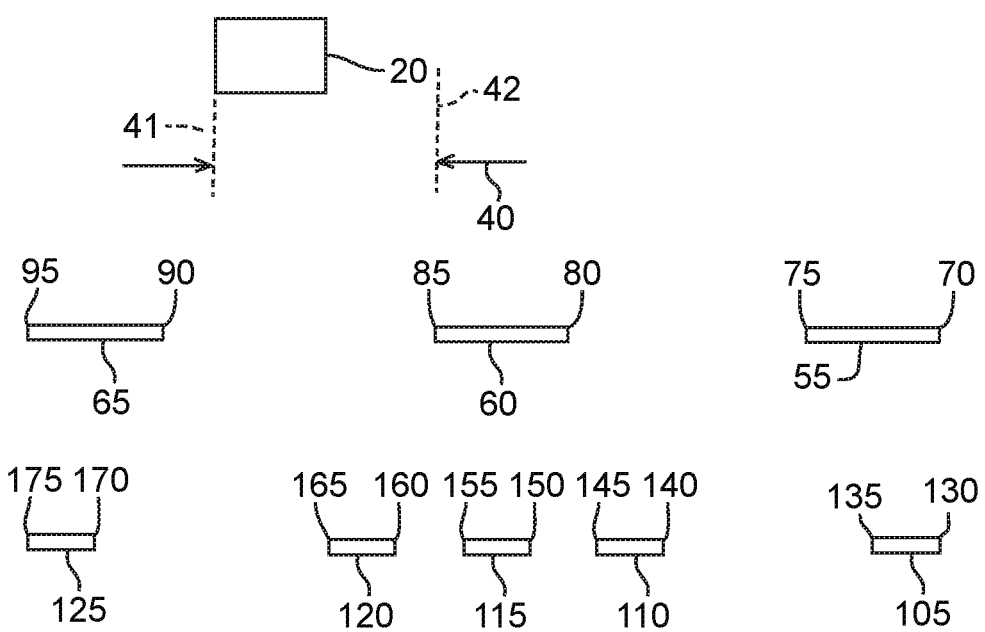
FIG. 14 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 14. With respect to the pallet 50, the first edge 41 of the operability window 40 encounters the floor underneath the pallet 50. In response to not detecting an edge of a bottom board, the first sensor arrangement 43 does not send a signal to the logic device 49. The second edge 42 of the operability window 40 encounters an edge 85 of the bottom board 60. In response to detecting an edge of a bottom board, the second sensor arrangement 46 sends a signal to the logic device to implement a change to a logic device secondary state. For example, the logic device 49 decrements a counter. With respect to the pallet 100, the first edge 41 of the operability window 40 encounters the floor underneath the pallet 100. In response to not detecting an edge of a bottom board, the first sensor arrangement 43 does not send a signal to the logic device 49. The second edge 42 of the operability window 40 encounters an edge 155 of the bottom board 115. In response to detecting an edge of a bottom board, the second sensor arrangement 46 sends a signal to the logic device to implement a change to a logic device secondary state. For example, the logic device 49 decrements a counter. At this point, the counter is decreased to 0 (zero) with respect to the pallet 50 and is decreased to +2 with respect to the pallet 100. With respect to the pallet 50, the logic device 49 may send a signal to an indicator that informs the operator that the load wheel mechanism is clear to be extended away from the fork 30, may activate the lifting mechanism, or both while there is a change to the logic device to the initial state, for example, the counter has a value of 0. However, with respect to the pallet 100, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 15:
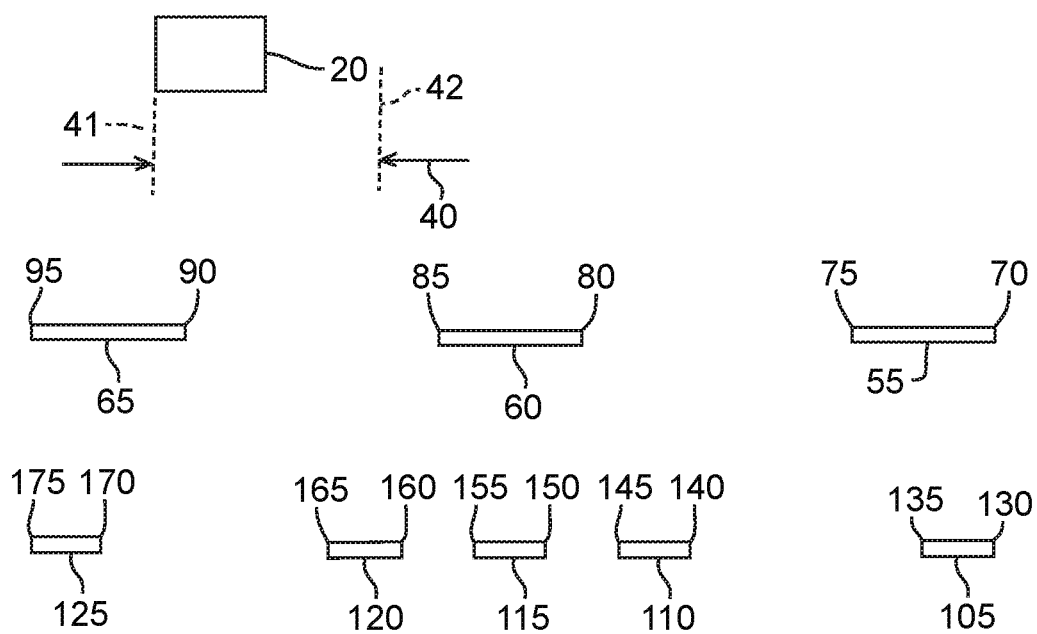
FIG. 15 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 15. With respect to the pallet 50, the first edge 41 of the operability window 40 encounters an edge 90 of the bottom board 65. In response to detecting an edge of a bottom board, the first sensor arrangement 43 sends a signal to the logic device 49 to implement a change to a logic device secondary state. For example, the logic device 49 increments a counter. The second edge 42 of the operability window 40 encounters the floor under the pallet 50. In response to not detecting an edge of a bottom board, the second sensor arrangement 46 does not send a signal to the logic device 49. With respect to the pallet 100, the first edge 41 of the operability window 40 encounters the floor under the pallet 100. In response to not detecting an edge of a bottom board, the first sensor arrangement 43 does not send a signal to the logic device 49. The second edge 42 of the operability window 40 encounters an edge 160 of the bottom board 120. In response to detecting an edge of a bottom board, the second sensor arrangement 46 sends a signal to the logic device 49 to implement a change to a logic device secondary state. For example, the logic device 49 decrements a counter. At this point, the counter is increased to +1 with respect to the pallet 50 and is decreased to +1 with respect to the pallet 100. With respect to the pallet 50, the logic device 49 may send a signal to an indicator that informs the operator that the load wheel mechanism is not clear to be extended away from the fork 30, may deactivate the lifting mechanism, or both while there is a change to the logic device secondary state, for example, the counter has a value other than 0 (zero). With respect to the pallet 100, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero).

Figure 16:
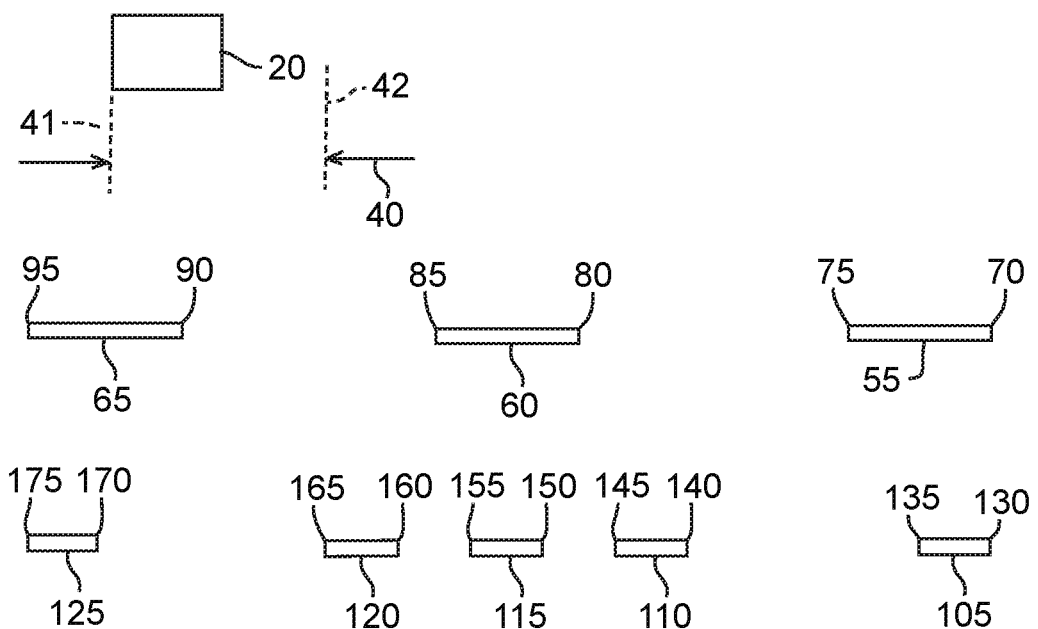
FIG. 16 is a schematic comparison of a load wheel continuing to enter over bottom boards of the example pallet of FIG. 2 and over the bottom boards of the example pallet of FIG. 3.

The pallet truck 5 continues to move into the pallet 50 or the pallet 100 as illustrated in FIG. 16. With respect to the pallet 50, the first edge 41 of the operability window 40 continues to encounter the bottom board 65. In response to not detecting an edge of a bottom board, the first sensor arrangement 43 does not send, a signal to the logic device 49. The second edge 42 of the operability window 40 encounters the floor under the pallet 50. In response to not detecting an edge of a bottom board, the second sensor arrangement 46 does not send a signal to the logic device 49. With respect to the pallet 100, the first edge 41 of the operability window 40 encounters the floor under the pallet 100. In response to not detecting an edge of a bottom board, the first sensor arrangement 43 does not send a signal to the logic device 49. The second edge 42 of the operability window 40 encounters an edge 165 of the bottom board 120. In response to detecting an edge of a bottom board, the second sensor arrangement 46 sends a signal to the logic device to implement a change to a logic device secondary state. For example, the logic device 49 decrements a counter. At this point, the counter remains at +1 with respect to the pallet 50 and is decreased to 0 (zero) with respect to the pallet 100. With respect to the pallet 50, the logic device 49 may continue to send a signal to an indicator that informs the operator that the load wheel mechanism is not clear to be extended away from the fork 30, may deactivate the lifting mechanism, or both while there is a change to the logic device secondary state, for example, the counter has a value other than 0 (zero). However, with respect to the pallet 100, the logic device 49 may send a signal to an indicator that informs the operator that the load wheel mechanism is clear to be extended away from the fork 30, may activate the lifting mechanism, or both while there is a change to the logic device to the initial state, for example, the counter has a value of 0 (zero).

As understood from the above description, the load wheel mechanism may become active, that is, enabled, or the operator may receive an indication, or both, whenever the logic device 49 determines that the operability window associated with each load wheel 20 and its associated lifting mechanisms is free from pallet boards. Thus, the operator may actuate the lifting mechanism to lift a pallet when there are no pallet boards located within an operability window regardless of how far the forks are inserted into the pallet.

When pallet truck 5 is withdrawn, from the pallet 50 or from the pallet 100, the process described above may be performed in reverse. Logic device 49 may continue to increment the counter in response to receiving signals from the first sensor arrangement 43 and decrement the counter in response to receiving signals from the second sensor arrangement 46. Or, in other embodiments, the logic device 49 may receive a direction signal. In response to receiving a direction signal indicating that the pallet truck 5 is moving into a pallet, the logic device 49 may increment the counter in response to receiving signals from the first sensor arrangement 43 and decrement the counter in response to receiving signals from the second sensor arrangement 46. And, in response to receiving a direction signal indicating that the pallet truck 5 is withdrawing from a pallet, the logic device 49 may decrement the counter in response to receiving signals from the first sensor arrangement 43 and increment the counter in response to receiving signals from the second sensor arrangement 46. Other suitable arrangements may be used.

Figure 17:
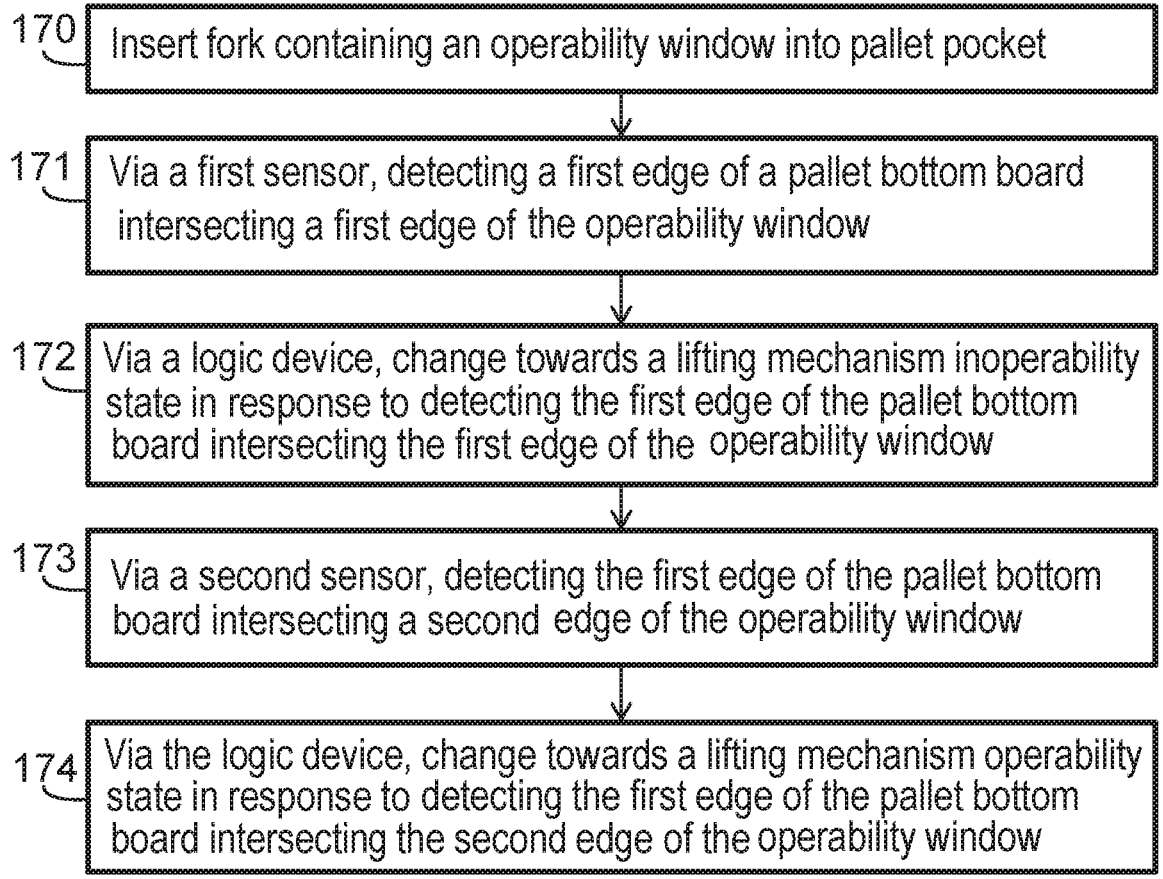
FIG. 17 is a flowchart of an example method for determining an operability condition or an inoperability condition for a lifting mechanism.
Figure 19:
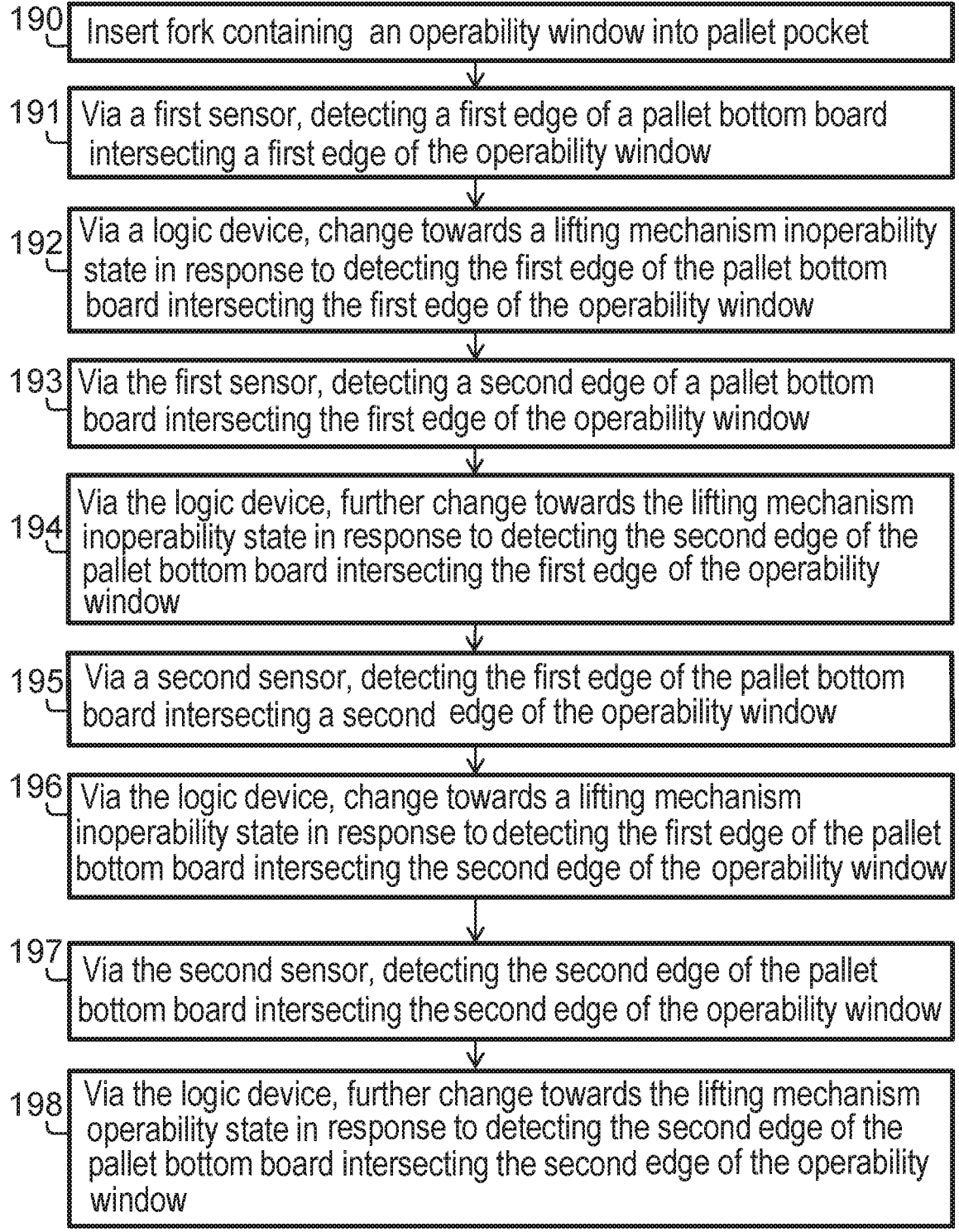
FIG. 19 is a flowchart of another example method for determining an operability condition or an inoperability condition for a lifting mechanism.

With reference to FIGS. 17-19, example methods are described. In step 170 of FIG. 17, forks bearing load wheels are inserted into the pocket of a pallet, such as the pallet 50 or the pallet 100. The forks include an operability window for the load wheels, where the operability window defines an area in which the load wheels and their associated mechanisms can be lowered without damaging a pallet bottom board. At step 171, a first sensor detects a first edge of a pallet bottom board intersecting a first edge of the operability window. In response to the first sensor detecting the first edge of the pallet bottom board intersecting the first edge of the operability window, a logic device changes to a lifting mechanism inoperability state at step 172. For example, a counter may be incremented by one. As the forks continue to be inserted into the pallet pocket, a second detector detects the first edge of the pallet bottom board intersecting a second edge of the operability window as step 173. In response to the second sensor detecting the first edge of the pallet bottom board intersecting the second edge of the operability window, a logic device changes to a lifting, mechanism operability state at step 174. For example, a counter may be decremented by one.

With, reference to FIG. 18, a method where forks are, inserted into and withdrawn from a pallet pocket is described. The forks include an operability window for the load wheels, where the operability window defines an area in which the load wheels and their associated mechanisms can be lowered without damaging a pallet bottom board. At step 180, forks bearing load wheels are inserted into the pocket of a pallet, such as the pallet 50 or the pallet 100. At step 181, a first sensor detects a first edge of a pallet bottom board intersecting a first edge of the operability window. In response to the first sensor detecting the first edge of the pallet bottom board intersecting the first edge of the operability window, a logic device changes to a lifting mechanism inoperability state at step 182. For example, a counter may be incremented by one. As the forks continue to be inserted into the pallet pocket, a second detector detects the first edge of the pallet bottom board intersecting a second edge of the operability window as step 183. In response to the second sensor detecting the first edge of the pallet bottom board intersecting the second edge of the operability window, a logic device changes to a lifting mechanism operability state at step 184. For example, a counter may be decremented by one. At step 185, the forks bearing the load wheels are withdrawn from the pocket of the pallet. At step 186, the second sensor detects the first edge of the pallet bottom board intersecting the second edge of the operability window. In response to the second sensor detecting the first edge of the pallet bottom board intersecting the second edge of the operability window, a logic device changes to a lifting mechanism inoperability state at step 188. For example, a counter may be incremented by one. As the forks continue to be withdrawn from the pallet pocket, the first detector detects the first edge of the pallet bottom board intersecting the first edge of the operability window at step 188. In response to the first sensor detecting the first edge of the pallet bottom board intersecting the first edge of the operability window, the logic device changes to a lifting mechanism operability state at step 189. For example, a counter may be decremented by one.

With reference to FIG. 19, an example method is described where multiple changes to lifting mechanism inoperability and operability states are made. In step 190, forks bearing load wheels are inserted into the pocket of a pallet, such as the pallet 50 or the pallet 100. The forks include an operability window for the load wheels, where the operability window defines an area in which the load wheels and their associated mechanisms can be lowered without damaging a pallet bottom board. At step 191, a first sensor detects a first edge of a pallet bottom board intersecting a first edge of the operability window. In response to the first sensor detecting the first edge of the pallet bottom board intersecting the first edge of the operability window, a logic device changes to a lifting mechanism inoperability state at step 192. For example, a counter may be incremented by one. As the forks continue to be inserted into the pallet pocket, the first sensor detects the second edge of the pallet bottom board intersecting the first edge of the operability window at step 193. In response to the first sensor detecting the second edge of the pallet bottom board intersecting the first edge of the operability window, the logic device changes to a lifting mechanism inoperability state at step 194. For example, a counter may be incremented by one, and may at this point have a value of 2. As the forks continue to be inserted into the pallet pocket, a second detector detects the first edge of the pallet bottom board intersecting a second edge of the operability window as step 195. In response to the second sensor detecting the first edge of the pallet bottom board intersecting the second edge of the operability window, the logic device changes to a lifting mechanism inoperability state at step 196. For example, a counter may be decremented by one, and may at this, point have a value of 1. As the forks continue to be inserted into the pallet pocket, the second sensor detects the second edge of the pallet bottom board intersecting the second edge of the operability window at step 197. In response to the second sensor detecting the second edge of the pallet bottom board intersecting the second edge of the operability window, the logic device changes to a lifting mechanism operability state at step 198. For example, a counter may be decremented by one, and may at this point have a value of 0 (zero) and thus allow the load wheels to be extended away from the forks.

In other embodiments an additional sensor arrangement may be included. Such additional sensor arrangement may be constructed and located such that it sends a signal to a logic device indicating whether the forks are clear of a pallet. If the forks are clear of a pallet the lifting mechanism may be enabled and sensor arrangements, such as the first sensor arrangement 43 and the second sensor arrangement 46, may be disabled. If the forks are not clear of a pallet the lifting mechanism may be disabled and sensor arrangements, such as the first sensor arrangement 43 and the second sensor arrangement 46, may be enabled.

Other embodiments include a means for detecting whether a bottom board of a pallet is, in an operability window defined as an area in which activation of the load wheel mechanism will not contact the bottom board of the pallet. In one embodiment, that means for detecting includes (a) a pair of sensor arrangements like the first sensor arrangement 43 or the second sensor arrangement 46 and (b) logic such as the logic device 49 operatively connected to the sensor arrangements. The sensor arrangements may be ultrasonic and comprise the ultrasonic device 44 or 47 with the reflector 45 or 48. Alternatively, the sensor arrangements may be based on other technologies, such as LIDAR, radar, or visible cameras. The logic device 49 may be a general-purpose microprocessor, special-purpose processor, digital signal processor (DSP), embedded controller, or the like programmed by in full or in part by software or firmware, which may be stored on a removable or permanent computer-readable medium, including, for example, memory integrated circuits (e.g., RAM, ROM, EPROM, EEPROM), magnetic discs, or optical discs. Alternatively, the logic device 49 may be implemented in fixed or semi-fixed logic integrated into one or several devices, include one or more application specific integrated circuits (ASICs), field-programmable gate arrays (FPGA), programmable logic arrays (PLAs), etc.

The means for detecting whether a bottom board of a pallet is in an operability window may comprise a means for alternately detecting leading and trailing edges of a bottom board of the pallet as the fork is inserted into a pocket of the pallet and a means for keeping track of whether the last detected edge of the bottom board is a leading edge or a trailing edge and thereby determining whether the bottom board of the pallet is in the operability window. The means for alternately detecting leading and trailing edges of a bottom board of the pallet may be a pair of sensor arrangements like the first sensor arrangement 43 or the second sensor arrangement 46 and the various alternatives described above. The means for keeping track of whether the last detected edge of the bottom board is a leading edge or a trailing edge may be the logic device 49 and its various alternatives as described above.

Some embodiments may further comprise optional means for alternately disabling and enabling operation of the lifting mechanism based on the determination whether the bottom board of the pallet is in the operability window and or optional means for alternately providing a disabled alert and an enabled alert to an operator based on the determination whether the bottom board of the pallet is in the operability window.

It will be apparent to those skilled in the art that various modifications and variations can be made in the disclosed embodiments of the disclosed device and associated methods without departing from the spirit or scope of the disclosure. Those with skill in the art will readily appreciate that embodiments may be implemented in a wide variety of ways. Thus, it is intended that the present disclosure covers the modifications and variations of the embodiments disclosed above within the scope of any claims and their equivalents.

The invention claimed is:

1. A system for a pallet truck load wheel mechanism, the system comprising:
    a logic device;
    a first sensor arrangement secured to the pallet truck on a first side of the load wheel mechanism and operatively connected to the logic device;
    a second sensor arrangement secured to the pallet truck on a second side of the load wheel mechanism and operatively connected to the logic device;
    wherein the first sensor arrangement includes a first sensing field that defines a first edge of an operability window;
    wherein the second sensor arrangement includes a second sensing field that defines a second edge of the operability window;
    wherein the logic device has an operable state indicating that the load wheel mechanism can raise a pallet lifting device and an inoperable state indicating that the load wheel mechanism should not raise the pallet lifting device;
    wherein the logic device is initialized in the operable state;
    wherein the logic device is configured to change to the inoperable state in response to each time the first sensor arrangement detects an edge of a board intersecting the first edge of the operability window;
    wherein the logic device is further configured to change to the operable state in response to each time the second sensor arrangement detects an edge of a board intersecting the second edge of the operability window; and
    wherein the logic device comprises a counter, the logic device is further configured to change to the inoperable state by incrementing the counter, the logic device is further configured to change to the operable state by decrementing the counter, and the logic device indicates an operable state for the load wheel mechanism to raise a pallet lifting device occurs when the counter equals zero.

2. The system according to claim 1, further comprising:
    a third sensor arrangement operatively connected to the logic device, wherein the third sensor arrangement is configured to detect a pallet above the pallet lifting device;
    wherein the logic device is further configured to be in the operable state in response to the third sensor arrangement not detecting a pallet above the pallet lifting device; and
    wherein the logic device is further configured to change between the operable state and the inoperable state in response to the first sensor arrangement and the second sensor arrangement detecting an object intersecting the first edge of the lifting mechanism operability window and the second edge of the lifting mechanism operability window, respectively, enabled by the third sensor arrangement detecting a pallet above the pallet lifting device.

3. The system according to claim 1, wherein the logic device comprises a processor.

4. The system according to claim 1, wherein:
the first sensor arrangement comprises an ultrasonic device and a reflector; and
the second sensor arrangement comprises an ultrasonic device and a reflector.

5. The system according to claim 1, wherein:
the logic device is further configured to disable operation of the load wheel mechanism in response to the logic device indicating the inoperable state; and
the logic device is further configured to enable operation of the load wheel mechanism in response to the logic device indicating the operable state.

6. The system according to claim 5, wherein:
the logic device is further configured to provide a disabled alert to an operator in response to the logic device indicating the inoperable state; and
the logic device is further configured to provide an enabled alert to an operator in response to the logic device indicating the operable state.

7. The system according to claim 1, wherein:
the logic device is further configured to provide a disabled alert to an operator in response to the logic device indicating the inoperable state; and
the logic device is further configured to provide an enabled alert to an operator in response to the logic device indicating the operable state.

8. A method for determining an operability condition or an inoperability condition for a lifting mechanism operably connected to a pallet lifting device, the method comprising:
changing a logic device from a state indicating an operability condition for the lifting mechanism to a state indicating an inoperability condition for the lifting mechanism in response to a first sensor detecting an edge of a board intersecting a first edge of a lifting mechanism operability window as the pallet lifting device is inserted into a pocket of the pallet;
changing the logic device from the state indicating the inoperability condition for the lifting mechanism to the state indicating the operability condition for the lifting mechanism in response to a second sensor detecting the edge of the board intersecting a second edge of the lifting mechanism operability window as the pallet lifting device is inserted into the pocket of the pallet;
changing the logic device from the state indicating an operability condition for the lifting mechanism to the state indicating an inoperability condition for the lifting mechanism in response to the second sensor detecting the edge of the board intersecting the second edge of the lifting mechanism operability window in response to the pallet lifting device being withdrawn from the pallet; and
changing the logic device from the state indicating the inoperability condition for the lifting mechanism to the state indicating the operability condition for the lifting mechanism in response to the first sensor detecting the edge of the board intersecting the first edge of the lifting mechanism operability window in response to the pallet lifting device being withdrawn from the pallet.

9. The method according to claim 8, wherein changing the logic device from the state indicating an operability condition for the lifting mechanism to the state indicating an inoperability condition for the lifting mechanism comprises incrementing a counter by one, and wherein changing the logic device from the state indicating the inoperability condition for the lifting mechanism to the state indicating the operability condition for the lifting mechanism comprises decrementing the counter by one, the method further comprising:
further changing the logic device to the state indicating an inoperability condition for the lifting mechanism by incrementing the counter by one in response to the first sensor detecting a second edge of the board intersecting the first edge of the lifting mechanism operability window; and
further changing the logic device from the state indicating the inoperability condition for the lifting mechanism to the state indicating the operability condition for the lifting mechanism by decrementing the counter by one in response to the second sensor detecting the second edge of the board intersecting the second edge of the lifting mechanism operability window; and
wherein the logic device state indicating the operability condition for the lifting mechanism occurs when the counter equals zero.

10. The method according to claim 8, further comprising:
detecting, by the first sensor, an edge of a board intersecting a first edge of a lifting mechanism operability window in response to the pallet lifting device being inserted into a pallet; and
detecting, by the second sensor, the edge of the board intersecting a second edge of the lifting mechanism operability window in response to the pallet lifting device being inserted into the pallet.

11. The method according to claim 10, wherein the edge of the board is detected by transmitting an ultrasonic signal and detecting a reflection of the ultrasonic signal.

12. The method according to claim 8, further comprising:
disabling operation of the lifting mechanism in response to the logic device indicating the inoperable state; and
enabling operation of the lifting mechanism in response to the logic device indicating the operable state.

13. The method according to claim 12, further comprising:
providing a disabled alert to an operator in response to the logic device indicating the inoperable state; and
providing an enabled alert to an operator in response to the logic device indicating the operable state.

14. The method according to claim 8, further comprising:
providing a disabled alert to an operator in response to the logic device indicating the inoperable state; and
providing an enabled alert to an operator in response to the logic device indicating the operable state.

15. A pallet truck comprising:
a fork;
a load wheel mechanism on the fork; and
a means for detecting whether a bottom board of a pallet is in an operability window defined as an area in which activation of the load wheel mechanism will not contact the bottom board of the pallet, wherein the means for detecting whether a bottom board of a pallet is in an operability window comprises:
a means for alternately detecting leading and trailing edges of a bottom board of the pallet as the fork is inserted into a pocket of the pallet;
a means for monitoring whether the last detected edge of the bottom board is a leading edge or a trailing edge and thereby determining whether the bottom board of the pallet is in the operability window.

16. The pallet truck of claim 15, further comprising:
a means for alternately disabling and enabling operation of the lifting mechanism based on the determination whether the bottom board of the pallet is in the operability window.

17. The pallet truck of claim 15, further comprising:
a means for alternately providing a disabled alert and an enabled alert to an operator based on the determination whether the bottom board of the pallet is in the operability window.

18. A system for a pallet truck load wheel mechanism, the system comprising:
a logic device;
a first sensor arrangement secured to the pallet truck on a first side of the load wheel mechanism and operatively connected to the logic device;
a second sensor arrangement secured to the pallet truck on a second side of the load wheel mechanism and operatively connected to the logic device;
a third sensor arrangement operatively connected to the logic device, wherein the third sensor arrangement is configured to detect a pallet above the pallet lifting device;
wherein the first sensor arrangement includes a first sensing field that defines a first edge of an operability window;
wherein the second sensor arrangement includes a second sensing field that defines a second edge of the operability window;
wherein the logic device has an operable state indicating that the load wheel mechanism can raise a pallet lifting device and an inoperable state indicating that the load wheel mechanism should not raise the pallet lifting device;
wherein the logic device is initialized in the operable state;
wherein the logic device is configured to change to the inoperable state in response to each time the first sensor arrangement detects an edge of a board intersecting the first edge of the operability window;
wherein the logic device is further configured to change to the operable state in response to each time the second sensor arrangement detects an edge of a board intersecting the second edge of the operability window;
wherein the logic device is further configured to be in the operable state in response to the third sensor arrangement not detecting a pallet above the pallet lifting device; and
wherein the logic device is further configured to change between the operable state and the inoperable state in response to the first sensor arrangement and the second sensor arrangement detecting an object intersecting the first edge of the lifting mechanism operability window and the second edge of the lifting mechanism operability window, respectively, enabled by the third sensor arrangement detecting a pallet above the pallet lifting device.

19. The system according to claim 18, wherein the logic device comprises a processor.

20. The system according to claim 18, wherein:
the first sensor arrangement comprises an ultrasonic device and a reflector; and
the second sensor arrangement comprises an ultrasonic device and a reflector.

21. The system according to claim 18, wherein:
the logic device is further configured to disable operation of the load wheel mechanism in response to the logic device indicating the inoperable state; and
the logic device is further configured to enable operation of the load wheel mechanism in response to the logic device indicating the operable state.

22. The system according to claim 21, wherein:
the logic device is further configured to provide a disabled alert to an operator in response to the logic device indicating the inoperable state; and
the logic device is further configured to provide an enabled alert to an operator in response to the logic device indicating the operable state.

23. The system according to claim 18, wherein:
the logic device is further configured to provide a disabled alert to an operator in response to the logic device indicating the inoperable state; and
the logic device is further configured to provide an enabled alert to an operator in response to the logic device indicating the operable state.

24. A system for a pallet truck load wheel mechanism, the system comprising:
a logic device;
a first sensor arrangement secured to the pallet truck on a first side of the load wheel mechanism and operatively connected to the logic device, wherein the first sensor arrangement comprises an ultrasonic device and a reflector;
a second sensor arrangement secured to the pallet truck on a second side of the load wheel mechanism and operatively connected to the logic device, wherein the second sensor arrangement comprises an ultrasonic device and a reflector;
wherein the first sensor arrangement includes a first sensing field that defines a first edge of an operability window;
wherein the second sensor arrangement includes a second sensing field that defines a second edge of the operability window;
wherein the logic device has an operable state indicating that the load wheel mechanism can raise a pallet lifting device and an inoperable state indicating that the load wheel mechanism should not raise the pallet lifting device;
wherein the logic device is initialized in the operable state;
wherein the logic device is configured to change to the inoperable state in response to each time the first sensor arrangement detects an edge of a board intersecting the first edge of the operability window; and
wherein the logic device is further configured to change to the operable state in response to each time the second sensor arrangement detects an edge of a board intersecting the second edge of the operability window.

25. The system according to claim 24, wherein the logic device comprises a processor.

26. The system according to claim 24, wherein:
the logic device is further configured to disable operation of the load wheel mechanism in response to the logic device indicating the inoperable state; and
the logic device is further configured to enable operation of the load wheel mechanism in response to the logic device indicating the operable state.

27. The system according to claim 24, wherein:
the logic device is further configured to provide a disabled alert to an operator in response to the logic device indicating the inoperable state; and
the logic device is further configured to provide an enabled alert to an operator in response to the logic device indicating the operable state.

28. The system according to claim 24, wherein:
the logic device is further configured to provide a disabled alert to an operator in response to the logic device indicating the inoperable state; and
the logic device is further configured to provide an enabled alert to an operator in response to the logic device indicating the operable state.

29. A method for determining an operability condition or an inoperability condition for a lifting mechanism operably connected to a pallet lifting device, the method comprising:
changing a logic device from a state indicating an operability condition for the lifting mechanism to a state indicating an inoperability condition for the lifting mechanism in response to a first sensor detecting an edge of a board intersecting a first edge of a lifting mechanism operability window as the pallet lifting device is inserted into a pocket of the pallet; and
changing the logic device from the state indicating the inoperability condition for the lifting mechanism to the state indicating the operability condition for the lifting mechanism in response to a second sensor detecting the edge of the board intersecting a second edge of the lifting mechanism operability window as the pallet lifting device is inserted into the pocket of the pallet, wherein changing the logic device from the state indicating an operability condition for the lifting mechanism to the state indicating an inoperability condition for the lifting mechanism comprises incrementing a counter by one, and wherein changing the logic device from the state indicating the inoperability condition for the lifting mechanism to the state indicating the operability condition for the lifting mechanism comprises decrementing the counter by one;
further changing the logic device to the state indicating an inoperability condition for the lifting mechanism by incrementing the counter by one in response to the first sensor detecting a second edge of the board intersecting the first edge of the lifting mechanism operability window;
further changing the logic device from the state indicating the inoperability condition for the lifting mechanism to the state indicating the operability condition for the lifting mechanism by decrementing the counter by one in response to the second sensor detecting the second edge of the board intersecting the second edge of the lifting mechanism operability window; and
wherein the logic device state indicating the operability condition for the lifting mechanism occurs when the counter equals zero.

30. The method according to claim 29, further comprising:
detecting, by the first sensor, an edge of a board intersecting a first edge of a lifting mechanism operability window in response to the pallet lifting device being inserted into a pallet; and
detecting, by the second sensor, the edge of the board intersecting a second edge of the lifting mechanism operability window in response to the pallet lifting device being inserted into the pallet.

31. The method according to claim 30, wherein the edge of the board is detected by transmitting an ultrasonic signal and detecting a reflection of the ultrasonic signal.

32. The method according to claim 29, further comprising:
disabling operation of the lifting mechanism in response to the logic device indicating the inoperable state; and
enabling operation of the lifting mechanism in response to the logic device indicating the operable state.

33. The method according to claim 32, further comprising:
providing a disabled alert to an operator in response to the logic device indicating the inoperable state; and
providing an enabled alert to an operator in response to the logic device indicating the operable state.

34. The method according to claim 29, further comprising:
providing a disabled alert to an operator in response to the logic device indicating the inoperable state; and
providing an enabled alert to an operator in response to the logic device indicating the operable state.

35. A method for determining an operability condition or an inoperability condition for a lifting mechanism operably connected to a pallet lifting device, the method comprising:
changing a logic device from a state indicating an operability condition for the lifting mechanism to a state indicating an inoperability condition for the lifting mechanism in response to a first sensor detecting an edge of a board intersecting a first edge of a lifting mechanism operability window as the pallet lifting device is inserted into a pocket of the pallet;
changing the logic device from the state indicating the inoperability condition for the lifting mechanism to the state indicating the operability condition for the lifting mechanism in response to a second sensor detecting the edge of the board intersecting a second edge of the lifting mechanism operability window as the pallet lifting device is inserted into the pocket of the pallet;
detecting, by the first sensor, an edge of a board intersecting a first edge of a lifting mechanism operability window in response to the pallet lifting device being inserted into a pallet; and
detecting, by the second sensor, the edge of the board intersecting a second edge of the lifting mechanism operability window in response to the pallet lifting device being inserted into the pallet.

36. The method according to claim 35, wherein the edge of the board is detected by transmitting an ultrasonic signal and detecting a reflection of the ultrasonic signal.

37. The method according to claim 35, further comprising:
disabling operation of the lifting mechanism in response to the logic device indicating the inoperable state; and
enabling operation of the lifting mechanism in response to the logic device indicating the operable state.

38. The method according to claim 37, further comprising:
providing a disabled alert to an operator in response to the logic device indicating the inoperable state; and
providing an enabled alert to an operator in response to the logic device indicating the operable state.

39. The method according to claim 35, further comprising:
provide a disabled alert to an operator in response to the logic device indicating the inoperable state; and
providing an enabled alert to an operator in response to the logic device indicating the operable state.

* * * * *

UNITED STATES PATENT AND TRADEMARK OFFICE
CERTIFICATE OF CORRECTION

PATENT NO. : 11,565,924 B2
APPLICATION NO. : 16/915611
DATED : January 31, 2023
INVENTOR(S) : Darrell Long It is certified that error appears in the above-identified patent and that said Letters Patent is hereby corrected as shown below:

On the Title Page

In Item (57), under "ABSTRACT", in Column 2, Line 12, delete "intersecting," and insert --intersecting-- therefor.

In the Specification

In Column 1, Line 41, delete "fondled" and insert --formed-- therefor.

In Column 4, Line 7, delete "pocket," and insert --pocket-- therefor.

In Column 4, Line 29, delete "lifting," and insert --lifting-- therefor.

In Column 4, Line 56, delete "connected," and insert --connected-- therefor.

In Column 5, Line 7, delete "detecting," and insert --detecting-- therefor.

In Column 7, Line 40, delete "like," and insert --like-- therefor.

In Column 9, Line 26, delete "toward" and insert --towards-- therefor.

In Column 9, Line 66, delete "W." and insert --W'.-- therefor.

In Column 11, Line 13, delete "46, however" and insert --46, however,-- therefor.

In Column 12, Line 37, delete "increased +2" and insert --increased to +2-- therefor.

In Column 17, Line 65, delete "With," and insert --With-- therefor.

In Column 17, Line 65, delete "forks are," and insert --forks are-- therefor.

Signed and Sealed this
Twentieth Day of February, 2024

Katherine Kelly Vidal
*Director of the United States Patent and Trademark Office*

In Column 19, Line 12, delete "In other embodiments" and insert --In other embodiments,-- therefor.

In Column 19, Line 24, delete "is," and insert --is-- therefor.

In Column 19, Line 67, delete "and or" and insert --and/or-- therefor.